US012224488B2

(12) United States Patent
Aoki et al.

(10) Patent No.: US 12,224,488 B2
(45) Date of Patent: Feb. 11, 2025

(54) WIRELESS COMMUNICATION APPARATUS

(71) Applicant: CANON KABUSHIKI KAISHA, Tokyo (JP)

(72) Inventors: Makoto Aoki, Tokyo (JP); Satoru Omura, Kanagawa (JP); Yutaka Ishinari, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 17/731,609

(22) Filed: Apr. 28, 2022

(65) Prior Publication Data

US 2022/0263236 A1 Aug. 18, 2022

Related U.S. Application Data

(63) Continuation of application No. PCT/JP2020/040142, filed on Oct. 26, 2020.

(30) Foreign Application Priority Data

Oct. 29, 2019 (JP) ................................ 2019-196344

(51) Int. Cl.
*H01Q 1/52* (2006.01)
*H01Q 1/24* (2006.01)
(Continued)

(52) U.S. Cl.
CPC ................. *H01Q 1/52* (2013.01); *H01Q 1/24* (2013.01); *H01Q 9/26* (2013.01); *H01Q 9/42* (2013.01)

(58) Field of Classification Search
CPC ............ H01Q 1/243; H01Q 9/26; H01Q 1/24; H01Q 1/12; H01Q 9/065; H01Q 9/285
See application file for complete search history.

(56) References Cited

U.S. PATENT DOCUMENTS 9,608,331 B1 3/2017 Rowson et al.
10,069,190 B2 9/2018 Aoki
(Continued)

FOREIGN PATENT DOCUMENTS

CN 1335654 A 2/2002
CN 1595719 A 3/2005
(Continued)

OTHER PUBLICATIONS

U.S. Appl. No. 17/668,461, filed Feb. 10, 2022, by Tomohisa Ishigami.
(Continued)

*Primary Examiner* — Hoang V Nguyen
*Assistant Examiner* — Aladdin Abdulnaki
(74) *Attorney, Agent, or Firm* — VENABLE LLP

(57) ABSTRACT

In a wireless communication apparatus according to the present invention, an antenna including an antenna element is disposed at a position closer to an opening of an outer housing than to a fixing member formed of an electric conductor and configured to fix the antenna, and an electric supply unit configured to supply the antenna with electric power and a first region that is positioned on an electric supply unit side of the antenna element are disposed closer to the fixing member than a second region including an open end portion of the antenna element.

16 Claims, 13 Drawing Sheets

(51) Int. Cl.
*H01Q 9/26* (2006.01)
*H01Q 9/42* (2006.01)

(56) References Cited

U.S. PATENT DOCUMENTS

| | | | | |
|---|---|---|---|---|
| 10,250,286 | B2 | 4/2019 | Aoki | |
| 10,516,200 | B2 | 12/2019 | Aoki | |
| 10,886,648 | B2 | 1/2021 | Aoki | |
| 10,978,802 | B2 * | 4/2021 | Abe | H01Q 9/42 |
| 2002/0093457 | A1 | 7/2002 | Hamada | |
| 2004/0090372 | A1 | 5/2004 | Nallo | |
| 2015/0311960 | A1 * | 10/2015 | Samardzija | H01Q 1/273 455/90.3 |
| 2016/0344096 | A1 | 11/2016 | Erentok | |
| 2017/0171451 | A1 | 6/2017 | Iwasa | |
| 2020/0021011 | A1 * | 1/2020 | Cooper | H01Q 1/523 |
| 2020/0212570 | A1 * | 7/2020 | Izawa | H01Q 1/36 |

FOREIGN PATENT DOCUMENTS

| | | | |
|---|---|---|---|
| JP | 9-36633 | A | 2/1997 |
| JP | 2000-151262 | A | 5/2000 |
| JP | 2002-280821 | A | 9/2002 |
| JP | 2006-311449 | A | 11/2006 |
| JP | 2014-3442 | A | 1/2014 |
| JP | 2017-111218 | A | 6/2017 |
| JP | 2018-517350 | A | 6/2018 |
| WO | 2016/125556 | A1 | 8/2016 |

OTHER PUBLICATIONS

U.S. Appl. No. 17/829,398, filed Jun. 1, 2022, by Makoto Aoki.

European Search Report issued Sep. 10, 2023 in corresponding European Patent Application No. 20881097.8.

International Search Report dated May 3, 2022 in International Application No. PCT/JP2020/040142 (English translation included).

Kazuhiro Hirasawa, "A basic technology of characteristic and solution of an antenna", Nikkan Kougyou Shimbun, Ltd., (Feb. 17, 2011), p. 113.

International Search Report dated Dec. 28, 2020 in International Application No. PCT/JP2020/040142, with English translation.

"Antenna and Appearance Design of Wearable Devices" by Yi-hua Zhang, www.cnki.net, Xi'an Polytechnic University, 2018.

Chinese Office Action issued Oct. 29, 2024 during prosecution of related Chinese application No. 202080076405.7 (English-language machine translation included.).

* cited by examiner

WIRELESS COMMUNICATION APPARATUS

CROSS-REFERENCE TO RELATED APPLICATIONS

This application is a Continuation of International Patent Application No. PCT/JP2020/040142, filed Oct. 26, 2020, which claims the benefit of Japanese Patent Application No. 2019-196344, filed Oct. 29, 2019, both of which are hereby incorporated by reference herein in their entirety.

BACKGROUND OF THE INVENTION

Field of the Invention

The present invention radiates to a wireless communication apparatus that causes electromagnetic waves received from an antenna to radiate outward.

Description of the Related Art

Modern electronic apparatuses normally come with a wireless communication function. For example, a digital radiography (DR), which visualizes inside organs of a human body (living body) by radiating radioactive rays, is capable of remote operation such as image-capturing operation from a PC and capable of transferring a captured image to the PC over a wireless LAN or Bluetooth®.

A wireless communication apparatus involves a problem in that a radiant quantity of radio waves at a communication frequency lowers when a component (member) formed of an electric conductor is disposed in a vicinity of a radio antenna. A DR is normally enclosed by a metallic outer housing with an opening in a vicinity of an antenna for size and thickness reduction and enhancement of drop impact resistance. In addition, in a vicinity of the antenna, a plate-shaped conductive member is disposed. The conductive member is used as a fixing member for fixing the antenna. Having the structure described above, a DR also involves a problem in that a radiant quantity of radio waves is significantly reduced at a communication frequency.

One of measures for preventing such a reduction in radiant quantity of radio waves, for example, a method of increasing an electric power supplied to an antenna to make up for a decrease in radiated electric power, increasing a radiant quantity of radio waves at a communication frequency is known, as described in "A basic technology of characteristic and solution of an antenna", written by Kazuhiro Hirasawa, Nikkan Kougyou Shimbun, Ltd., (2011 Feb. 17), p. 113.

It is generally known that when high-power electromagnetic waves emitted by an antenna of a wireless communication apparatus enter a human body and are absorbed by the human body, a temperature of the human body locally rises. It is pointed out that the local rise in temperature of a human body may increase a risk of onset of, for example, cataract. Accordingly, limits of an energy of electromagnetic waves absorbed by a human body are determined by various countries in terms of specific absorption ratio (SAR) value. Conventional art involves a problem in that an SAR value becomes greater than a limit when an electric power supplied to an antenna is increased so as to prevent a reduction in radiant quantity of radio waves at a communication frequency.

The present invention is made in light of such a problem, and an objective of the present invention is to provide a wireless communication apparatus capable of decreasing an SAR value as well as preventing a reduction in radiant quantity of radio waves.

SUMMARY OF THE INVENTION

A wireless communication apparatus according to the present invention includes: an antenna including an antenna element; a fixing member formed of an electric conductor and configured to fix the antenna; an electric supply unit electrically connected to the antenna and configured to supply electric power to the antenna; and an outer housing formed of an electric conductor and configured to enclose the antenna, the fixing member, and the electric supply unit, the outer housing having an opening for allowing electromagnetic waves from the antenna to radiate outward from the outer housing, wherein the antenna is disposed at a position closer to the opening of the outer housing than to the fixing member, and the electric supply unit and a first region that is positioned on the electric supply unit side of the antenna element are disposed at a position closer to the fixing member than a second region including an open end portion of the antenna element positioned on an opposite side of the antenna element to the electric supply unit.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
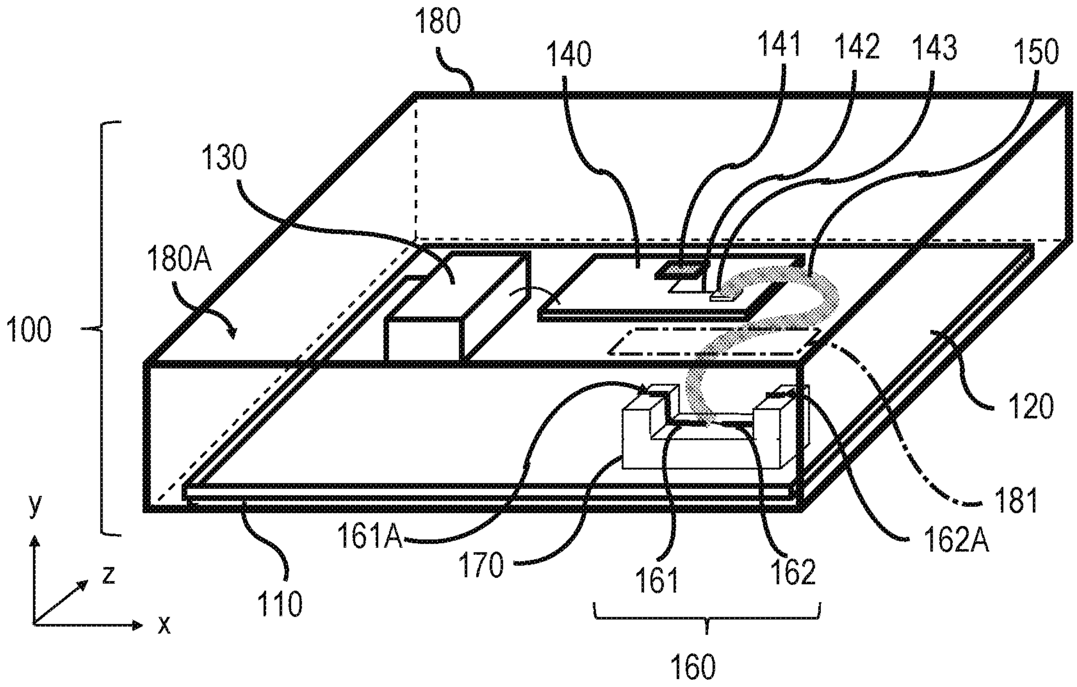
FIG. 1 is a diagram illustrating an example of a schematic configuration of a wireless communication apparatus according to a first embodiment of the present invention.

FIG. 1 is a diagram illustrating an example of a schematic configuration of a wireless communication apparatus 100 according to a first embodiment of the present invention. Here, in the present embodiment, a digital radiography (DR) is applied as an example of the wireless communication apparatus 100.

The wireless communication apparatus 100 includes a sensor 110, a fixing member 120, a battery 130, a printed circuit board 140, a coaxial cable 150, an antenna 160, an antenna supporting member 170, and an outer housing 180.

The battery 130 is a mechanism that supplies electric power, and the battery 130 is electrically connected to the printed circuit board 140.

On the printed circuit board 140, a wireless IC 141, a signal wiring 142, and a connector 143 are mounted. The wireless IC 141 generates a data signal for wireless communication, which is transferred via the signal wiring 142, the connector 143, and the coaxial cable 150, to the antenna 160. The printed circuit board 140 supplies electric power from the battery 130 to the antenna 160 via the coaxial cable 150.

The coaxial cable 150 is electrically connected to the antenna 160 to supply the antenna 160 with the data signal for wireless communication and the electric power described above. The coaxial cable 150 that supplies the electric power to the antenna 160 is equivalent to an "electric supply unit".

The antenna 160 includes a first antenna element 161 and a second antenna element 162 and is adapted as a dipole antenna. Here, the first antenna element 161 and the second antenna element 162 are each formed with, for example, a rod-shaped metal. The antenna 160 is fixed to the fixing member 120 via the antenna supporting member 170. FIG. 1 also illustrates an open end portion 161A of the first antenna element 161 and an open end portion 162A of the second antenna element 162. Here, one end portions of the first antenna element 161 and the second antenna element 162 are adapted as the open end portions 161A and 162A, respectively, and between the other end portion of the first antenna element 161 and the other end portion of the second antenna element 162, the coaxial cable 150 being the electric supply unit is provided.

The antenna supporting member 170 supports the antenna 160 and is fixed to the fixing member 120.

The fixing member 120 is formed of an electric conductor and fixes the battery 130, the printed circuit board 140, and the antenna supporting member 170 at their respective positions on a front face (upper face) of the fixing member 120.

The sensor 110 is a constituting unit that detects incident radioactive rays, and the sensor 110 is disposed on (fixed to) a rear face (lower face) of the fixing member 120.

The outer housing 180 is a housing formed of an electric conductor and enclosing the sensor 110, the fixing member 120, the battery 130, the printed circuit board 140, the coaxial cable 150, the antenna 160, and the antenna supporting member 170. The outer housing 180 includes one face 180A that is provided with an opening 181 for allowing electromagnetic waves from the antenna 160 to radiate outward from the outer housing 180. In this case, the antenna 160 is disposed at a position closer to the opening 181 of the outer housing 180 than to the fixing member 120.

Here, the outer housing 180 and the fixing member 120 each formed of an electric conductor are each formed of a typical metallic member, such as stainless, aluminum, copper, and iron, or a resin member having electric conductivity, such as carbon fiber reinforced plastic. In a vicinity of the antenna 160, the outer housing 180 is provided with the opening 181 for allowing electromagnetic waves from the antenna 160 to radiate outward from the outer housing 180. This configuration enables the wireless communication apparatus 100 to perform wireless communication with another wireless communication apparatus. In this structure, a face for measurement of an SAR value, which relates to an energy of electromagnetic waves absorbed by a human body, is the one face 180A of the outer housing 180 in which the opening 181 is provided, that is, a face through which electromagnetic waves are radiated from the outer housing 180 to reach a human body. The other five faces of the outer housing 180 are shielded by metal and do not allow electromagnetic waves to radiate outward from the outer housing 180; therefore, the five faces do not serve as faces for the measurement of an SAR value. However, in a case where one or more openings are provided in one or more faces other than the face 180A, there are a plurality of faces for the measurement; in this case, a maximum value of SAR values measured for the plurality of faces will be used.

Note that FIG. 1 illustrates an xyz coordinate system where, for example, the front face (upper face) of the fixing member lies in an xz plane in an x direction and a z direction perpendicular to each other, and a direction perpendicular to the x direction and the z direction is a y direction.

Figure 2:
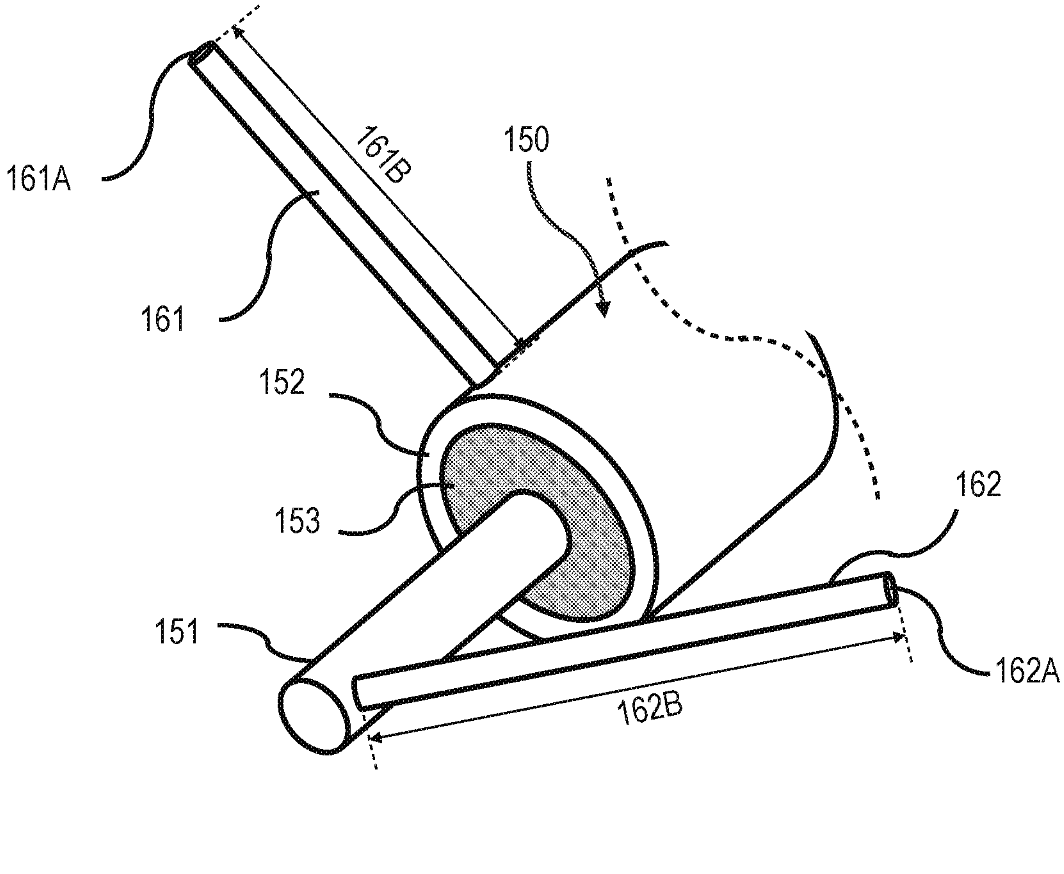
FIG. 2 is an enlarged view of a region including a coaxial cable, a first antenna element, and a second antenna element illustrated in FIG. 1.

FIG. 2 is an enlarged view of a region including the coaxial cable 150, the first antenna element 161 and the second antenna element 162.

The coaxial cable 150 includes a core wire 151, an outer sheath conductor 152 and a resin material 153. The second antenna element 162 and the core wire 151 are connected (electrically connected) to each other, and the first antenna element 161 and the outer sheath conductor 152 are connected (electrically connected) to each other. A dimension 161B relating to a length of the first antenna element 161 and a dimension 162B relating to a length of the second antenna element 162 are determined according to a frequency band to be used in the wireless communication so as to facilitate radiation of radio waves (electromagnetic waves). Note that the core wire 151 is connected (electrically connected) to the signal wiring 142 of the printed circuit board 140. The outer sheath conductor 152 is connected to a ground pattern of the printed circuit board 140, which is not illustrated, and the printed circuit board 140 is electrically connected to the fixing member 120 with a connection member, which is not illustrated.

Figure 3:
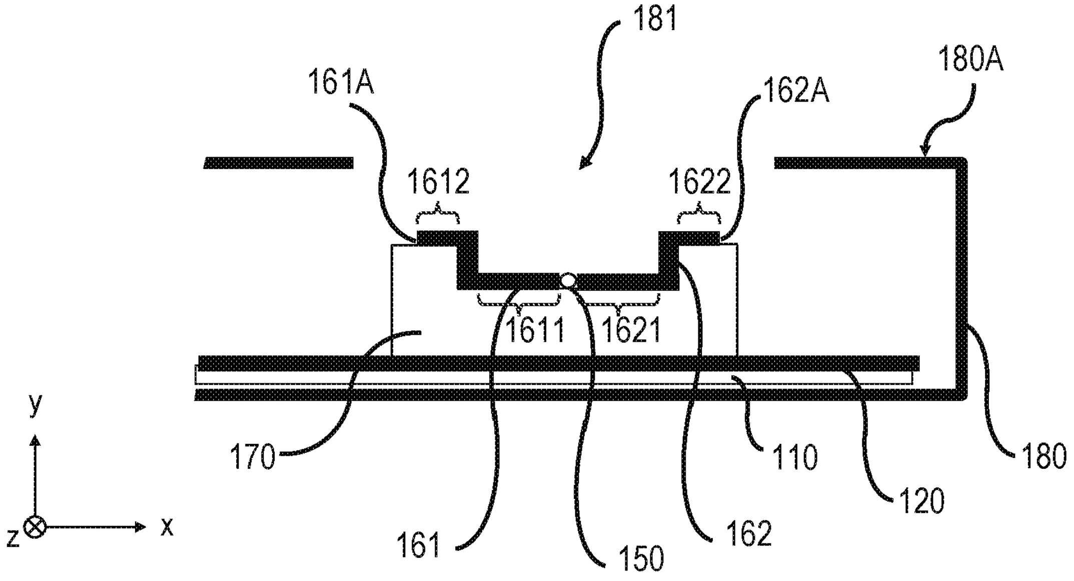
FIG. 3 is a cross-sectional view of an antenna on an xy plane as viewed from a z direction of FIG. 1.

FIG. 3 is a cross-sectional view of the antenna 160 on an xy plane as viewed from the z direction of FIG. 1. An xyz coordinate system illustrated here corresponds to the xyz coordinate system illustrated in FIG. 1. Components similar to those illustrated in FIG. 1 and FIG. 2 are denoted by the same reference characters, and detailed description thereof will be omitted.

Note that the antenna elements 161 and 162 are disposed such that the antenna elements 161 and 162 fit into dimensions of the opening 181; however, for example, the antenna supporting member 170 may be shifted in the x direction to dispose the antenna elements 161 and 162 such that the antenna elements 161 and 162 partly remain within the dimensions of the opening 181.

The antenna supporting member 170 has a stepped shape. The coaxial cable 150 being an electric supply unit as well as first regions 1611 and 1621 that are positioned on a coaxial cable 150 side of the antenna elements 161 and 162 are disposed at positions closer to the fixing member 120 than second regions 1612 and 1622 including the open end portions 161A and 162A, which are positioned on opposite sides of the antenna elements 161 and 162 to the coaxial cable 150, respectively. Further, the second regions 1612 and 1622 of the antenna elements 161 and 162 are disposed at positions closer to the opening 181 of the outer housing 180 than the coaxial cable 150 as well as the antenna elements 161 and 162 of the first regions 1611 and 1621, respectively. Adopting this structure of the antenna 160 including the first antenna element 161 and the second antenna element 162 enables decreasing an SAR value relating to an energy of electromagnetic waves absorbed by a human body as well as preventing a reduction in radiant quantity of radio waves at a communication frequency. This will be described in detail.

Figure 4A:
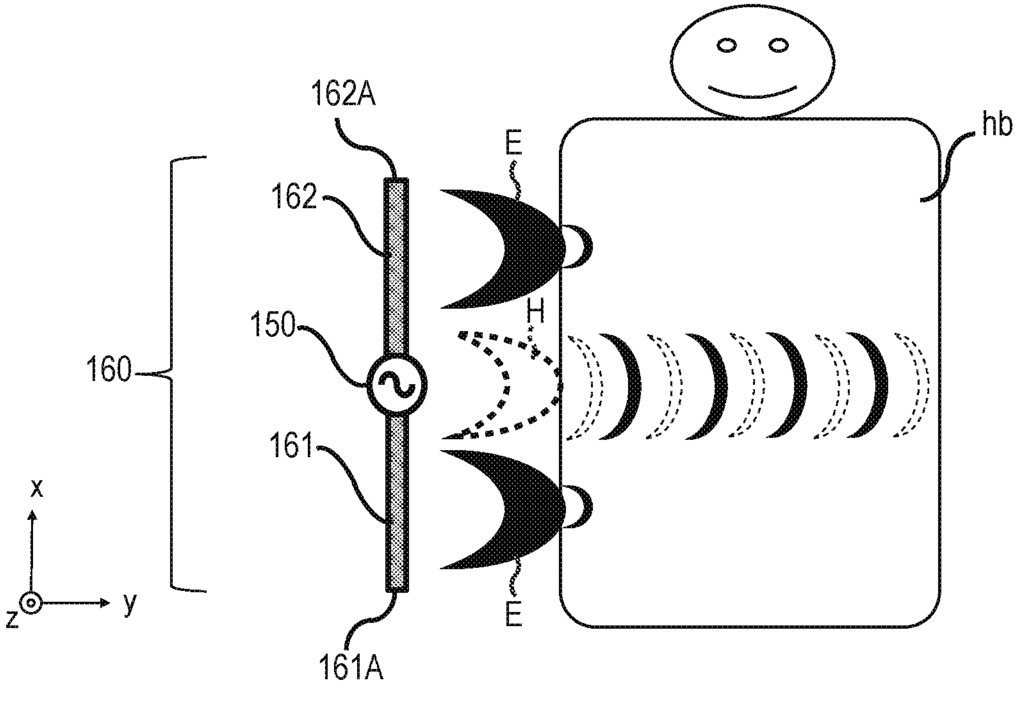
FIG. 4A is a conceptual diagram illustrating an electromagnetic field distribution in a neighbor region of the antenna illustrated in FIG. 1 and a human body.
Figure 4B:
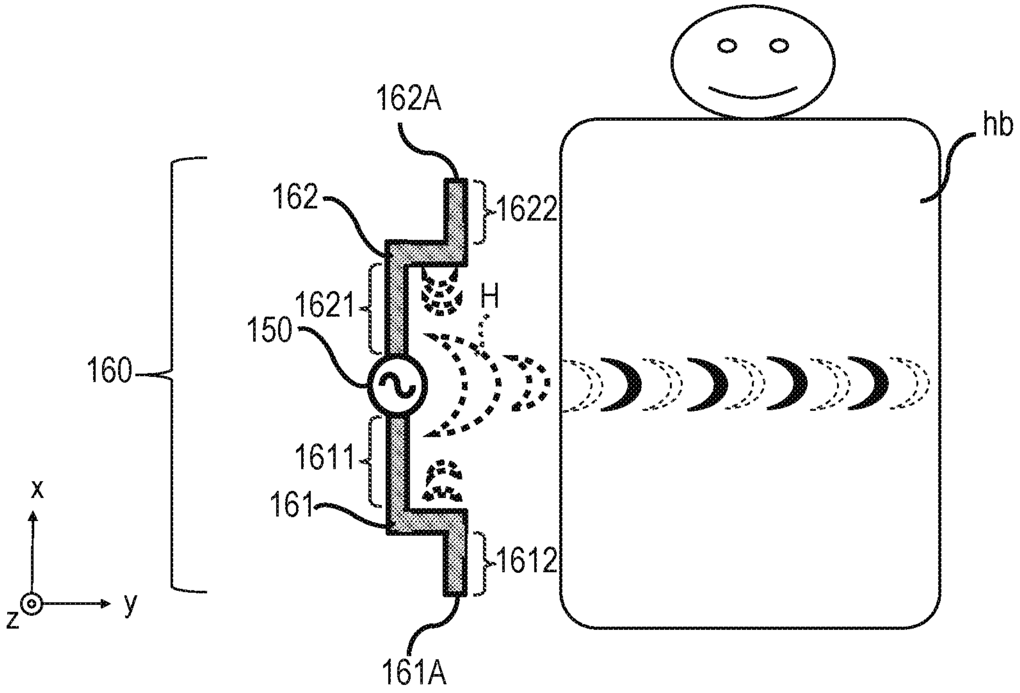
FIG. 4B is a conceptual diagram illustrating an electromagnetic field distribution in a neighbor region of the antenna illustrated in FIG. 1 and a human body.

FIG. 4A and FIG. 4B are conceptual diagrams each illustrating an electromagnetic field distribution in a neighbor region of the antenna 160 illustrated in FIG. 1 and a human body hb. Here, FIG. 4A and FIG. 4B each illustrate an xyz coordinate system corresponding to the xyz coordinate systems illustrated in FIG. 1 and FIG. 3. Further, in FIG. 4A, solid, crescent frames each indicate an electric field E, and dotted, crescent frames each indicate a magnetic field H.

FIG. 4A illustrates a structure of an antenna 160 according to a comparative example; in a vicinity of the antenna 160, an electric field E is mainly produced due to high impedances of neighborhoods of the open end portions 161A and 162A of the antenna elements 161 and 162. In contrast, a magnetic field H is mainly produced in a neighborhood of a connection portion between the antenna elements 161 and 162 and the coaxial cable 150 being an electric supply unit due to a low impedance of the neighborhood. When the antenna 160 is close to the human body hb, as illustrated in FIG. 4A, an electric field E in the vicinity of the antenna 160 does not propagate into the human body hb, while only a magnetic field H propagates into the human body hb. This is because a relative permittivity of the human body hb is as high as about 50, which causes an electric field E to rapidly attenuate to about 1/50 at a boundary between the air and the human body hb, where an electric flux D is continuous, according to the formula $D=\varepsilon E$. This is further because a relative permeability of the human body hb is 1, which is the same as that of the air, which does not cause a magnetic field H to attenuate at the boundary between the air and the human body hb, where a magnetic flux B is continuous, according to the formula $B=\mu H$. A magnetic field H that has propagated into the human body hb propagates through the human body hb in a form of an electromagnetic wave that alternates between an electric field E and a magnetic field H and is subjected to wavelength shortening determined according to a formula of wavelength $\lambda=c/(f\times\sqrt{\varepsilon})$. As an example of the wavelength shortening, a wavelength at a frequency f=5 [GHz] is 60 [mm] in the air but is 8.3 [mm] inside the human body hb, where the speed of light is $c=3\times10^{8}$ [m/s]. From the above, a magnitude of an SAR value relating to an energy of electromagnetic waves absorbed by a human body has a correlation with an intensity of a magnetic field H in a vicinity of the antenna 160.

FIG. 4B illustrates the structure of the antenna 160 according to the first embodiment of the present invention. That is, as with FIG. 3, the structure of the antenna 160 includes the first antenna element 161 having the first region 1611 and the second region 1612, and the second antenna element 162 having the first region 1621 and the second region 1622. Specifically, as illustrated in FIG. 4B, the coaxial cable 150 as well as the first region 1611 of the first antenna element 161 and the first region 1621 of the second antenna element 162, which form regions where an intensity of a magnetic field H is particularly high, are disposed being kept at a distance from the human body hb. Note that FIG. 4B illustrates a case where the human body hb is assumed to be present on a face 180A side of the outer housing 180 illustrated in FIG. 1. Here, the intensity of the magnetic field H in the vicinity of the antenna 160 attenuates as the distance from the antenna 160 increases, and thus the intensity of the magnetic field H that reaches the human body hb is reduced. Further, at regions where the antenna elements 161 and 162 are bent in a crank shape, as illustrated in FIG. 4B, a magnetic field H propagates in a parallel direction to the boundary of the human body hb and does not reach the human body hb. By these effects, the magnetic field H reaching the boundary of the human body hb is significantly reduced, and the SAR value relating to an energy of electromagnetic waves absorbed by a human body can be decreased.

Figure 5A:
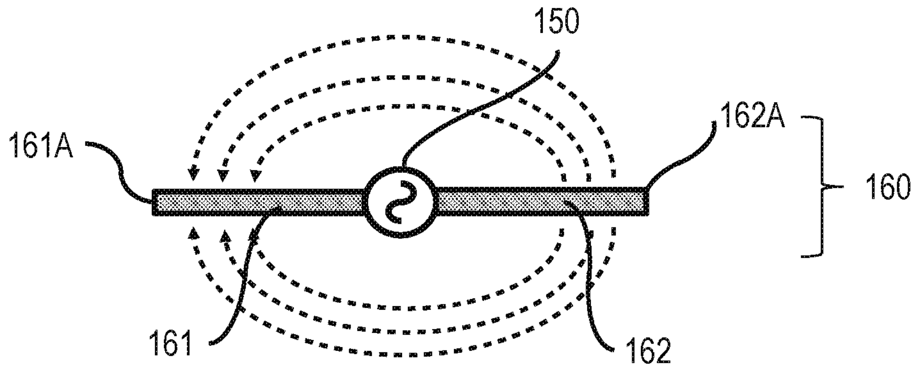
FIG. 5A is a conceptual diagram illustrating a distribution of an electric field formed by the antenna illustrated in FIG. 1.
Figure 5B:
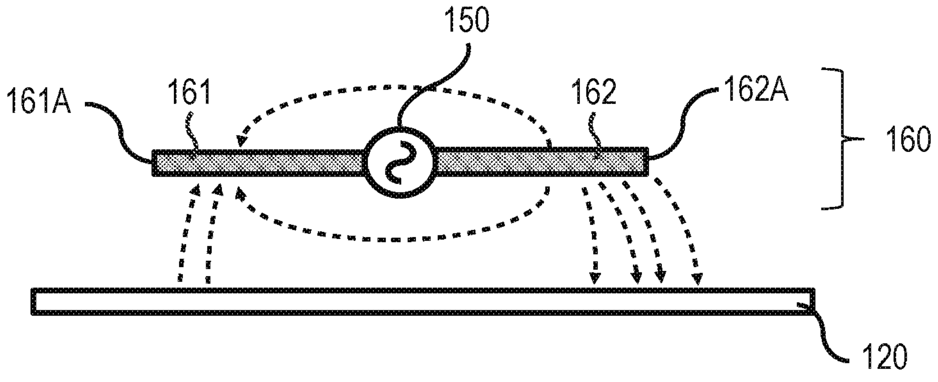
FIG. 5B is a conceptual diagram illustrating a distribution of an electric field formed by the antenna illustrated in FIG. 1.
Figure 5C:
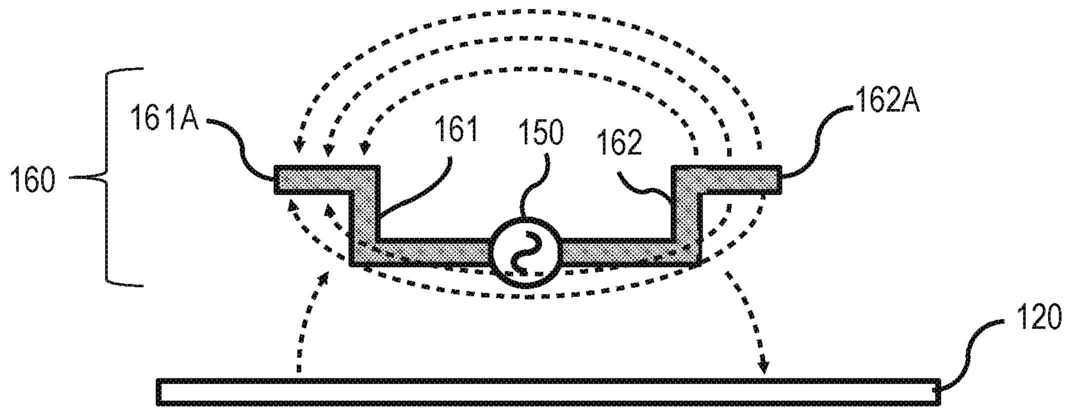
FIG. 5C is a conceptual diagram illustrating a distribution of an electric field formed by the antenna illustrated in FIG. 1.

FIG. 5A to FIG. 5C are conceptual diagrams each illustrating a distribution of an electric field formed by the antenna 160 illustrated in FIG. 1. Here, an antenna 160 illustrated in FIG. 5A and FIG. 5B is equivalent to the antenna 160 illustrated in FIG. 4A, and an antenna 160 illustrated in FIG. 5C is equivalent to the antenna 160 illustrated in FIG. 4B.

As illustrated in FIG. 5A, for example, in a case where the first antenna element 161 is negatively charged, the second antenna element 162 is positively charged, and an electric field E is formed between the first antenna element 161 and the second antenna element 162 as illustrated by dotted arrows. An intensity of the electric field E is highest in neighborhoods of the open end portion 161A of the first antenna element 161 and the open end portion 162A of the second antenna element 162 and becomes lower at a position closer to the coaxial cable 150 being an electric supply unit along a longitudinal direction of the first antenna element 161 and the second antenna element 162.

Further, as illustrated in FIG. 5B, in a case of presence of the fixing member 120, which is formed of an electric conductor and has a size larger than a size of the antenna 160, the electric field E formed between the first antenna element 161 and the second antenna element 162 is coupled with the fixing member 120. This causes potential variation in the fixing member 120. This coupling inhibits the antenna 160 from radiating radio waves out into space, which lowers a radiation efficiency of the antenna 160.

As illustrated in FIG. 5C, the antenna 160 in the present embodiment has a structure in which the open end portions 161A and 162A of the antenna elements 161 and 162, which form regions where an intensity of an electric field E emitted from the antenna 160 fixed with the antenna supporting member 170 is high, are kept away from the fixing member 120 formed of an electric conductor. The coupling between an electric field E and the fixing member 120, which has been described with reference to FIG. 5B, can be prevented as much as possible; as a result, the reduction in radiant quantity of radio waves at a communication frequency can be prevented (a radiant quantity of radio waves at the communication frequency can be increased compared with the case illustrated in FIG. 5B).

As described with reference to FIG. 4A to FIG. 5C, in the present embodiment, adopting this structure of the antenna 160 illustrated in FIG. 4B and FIG. 5C enables decreasing an SAR value relating to an energy of electromagnetic waves absorbed by a human body as well as preventing a reduction in a radiant quantity of radio waves at a communication frequency. Here, the antenna 160 in the present embodiment has a structure in which the coaxial cable 150, and the first regions 1611 and 1621 of the antenna elements 161 and 162, which are regions where an intensity of a magnetic field H is high, are disposed close to the fixing member 120 made of an electric conductor.

Figure 6A:
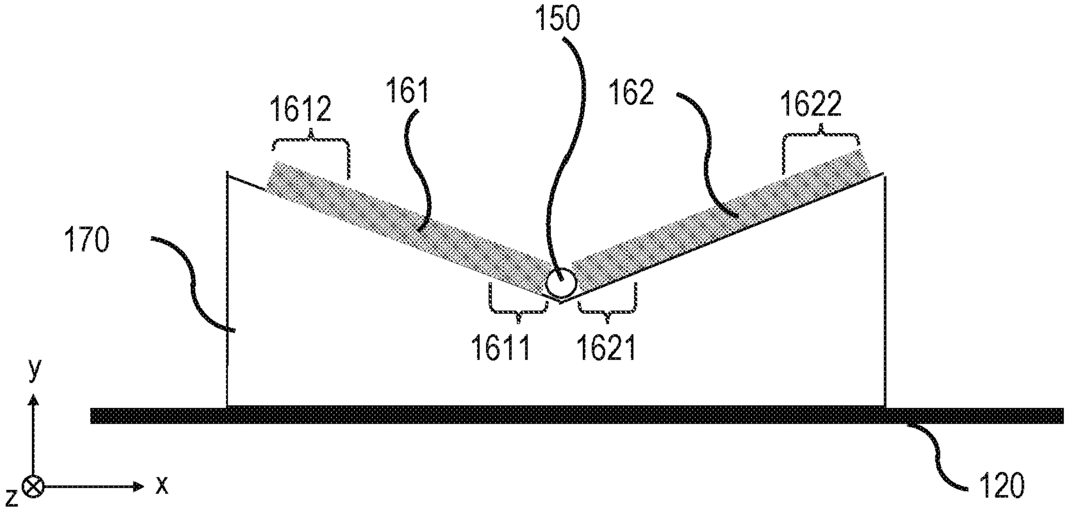
FIG. 6A is a cross-sectional view of an antenna on an xy plane as viewed from the z direction of FIG. 1.
Figure 6B:
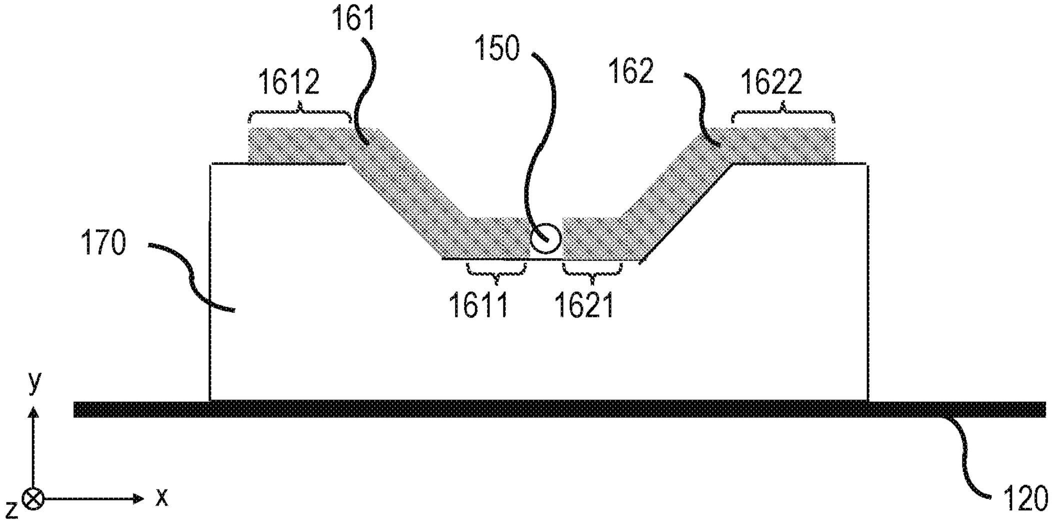
FIG. 6B is a cross-sectional view of an antenna on an xy plane as viewed from the z direction of FIG. 1.

FIG. 6A and FIG. 6B are each a cross-sectional view of the antenna 160 on an xy plane as viewed from the z direction of FIG. 1. Here, FIG. 6A and FIG. 6B each illustrate an xyz coordinate system corresponding to the xyz coordinate systems illustrated in FIG. 1 and FIG. 3. In FIG. 6A and FIG. 6B, components similar to those illustrated in FIG. 1 to FIG. 5C are denoted by the same reference characters, and detailed description thereof will be omitted.

In the present embodiment, shapes of the antenna 160 including the first antenna element 161 and the second antenna element 162 and shapes of the antenna supporting member 170 illustrated in FIG. 6A and FIG. 6B can be adopted.

FIG. 6A illustrates a configuration in which a portion of the antenna supporting member 170 for mounting the first antenna element 161 and the second antenna element 162 (additionally, the coaxial cable 150) thereon is formed in a V shape. In this configuration illustrated in FIG. 6A, the antenna supporting member 170 supports the first antenna element 161 and the second antenna element 162 in a linear pattern from their one end portions (open end portions 161A and 162A) to the other end portions (their end portions on the coaxial cable 150 side, the coaxial cable 150 being an electric supply unit).

FIG. 6B illustrates a configuration in which a portion of the antenna supporting member 170 for mounting the first antenna element 161 and the second antenna element 162 (additionally, the coaxial cable 150) thereon is formed in a combination of a V shape and a stepped shape. In this configuration illustrated in FIG. 6B, the antenna supporting member 170 supports the first antenna element 161 and the second antenna element 162 in a folded pattern between their one end portions (open end portions 161A and 162A) and their other end portions (their end portions on the coaxial cable 150 side, the coaxial cable 150 being an electric supply unit). The present embodiment is described about a configuration in which the antenna supporting member 170 supports the antenna elements 161 and 162 in a folded pattern; however, there may be a configuration in which, for example, the antenna supporting member 170 supports the antenna elements 161 and 162 in a curved pattern. That is, in the present embodiment, the antenna supporting member 170 can support the antenna elements 161 and 162 in at least one of a folded pattern and a curved pattern. Further, the number of folds may be one, or two or more.

In an example illustrated in FIG. 6B (FIG. 6A can be included), the first regions 1611 and 1621 of the antenna elements 161 and 162 are regions that do not reach midpoints of lengths of the antenna elements 161 and 162, respectively.

As described above, in the wireless communication apparatus 100 according to the first embodiment, the coaxial cable 150 being an electric supply unit as well as the first regions 1611 and 1621 of the antenna elements 161 and 162 are disposed at positions closer to the fixing member 120 formed of an electric conductor than the second regions 1612 and 1622 including the open end portions 161A and 162A of the antenna elements 161 and 162, respectively. Further, the second regions 1612 and 1622 of the antenna elements 161 and 162 are disposed at positions closer to the opening 181 for allowing electromagnetic waves from the antenna 160 to radiate outward from the outer housing 180 than the coaxial cable 150 being an electric supply unit as well as the first regions 1611 and 1621 of the antenna elements 161 and 162, respectively. This configuration enables, as described with reference to FIG. 4A to FIG. 5C, decreasing an SAR value relating to an energy of electromagnetic waves absorbed by a human body as well as preventing a reduction in a radiant quantity of radio waves at a communication frequency.

Second Embodiment

In the following description given of a second embodiment, description of matters shared with the first embodiment will be omitted, and matters different from the first embodiment will be described.

While the first embodiment is described about an example in which the antenna 160 is configured as a dipole antenna, the second embodiment will be described about a configuration to which an inverted-F antenna is applied.

A schematic configuration of a wireless communication apparatus according to the second embodiment is basically similar to the schematic configuration of the wireless communication apparatus 100 according to the first embodiment illustrated in FIG. 1 except for a configuration of an antenna 160 (an antenna supporting member 170 supporting the antenna 160 is included). In the present embodiment, a wireless communication apparatus 200 is described as the wireless communication apparatus according to the second embodiment.

Figure 7:
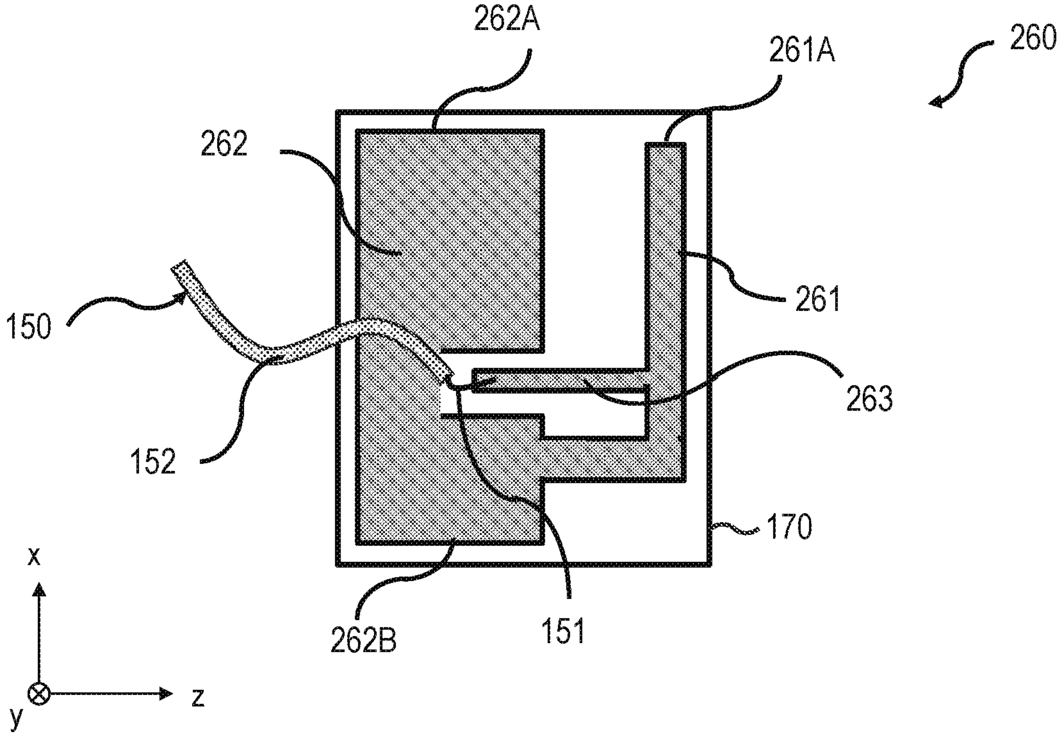
FIG. 7 illustrates a second embodiment of the present invention and is a diagram illustrating a schematic configuration example in which an inverted-F antenna supported by an antenna supporting member is applied as an antenna.

FIG. 7 illustrates the second embodiment of the present invention and is a diagram illustrating a schematic configuration example in which an inverted-F antenna supported by the antenna supporting member 170 is applied as an antenna 260. Here, FIG. 7 illustrates an xyz coordinate system corresponding to the xyz coordinate system illustrated in FIG. 1. In the example illustrated in FIG. 7, the antenna 260 supported by the antenna supporting member 170 formed of a flexible printed wiring board is illustrated.

As illustrated in FIG. 7, the antenna (inverted-F antenna) 260 includes an antenna element 261, a ground conductor portion 262 that forms a ground pattern, and a power supply line 263. A core wire 151 of a coaxial cable 150 is electrically connected to the power supply line 263, and an outer sheath conductor 152 is electrically connected to the ground conductor portion 262. The antenna element 261 includes one end portion that forms an open end portion 261A, the other end portion that is electrically connected to the ground conductor portion 262 to be short-circuited, and a portion between the one end portion and the other end portion that serves as the power supply line 263, which is electrically connected to the coaxial cable 150 being an electric supply unit. FIG. 7 further illustrates side edge portions 262A and 262B of the ground conductor portion 262.

Figure 8:
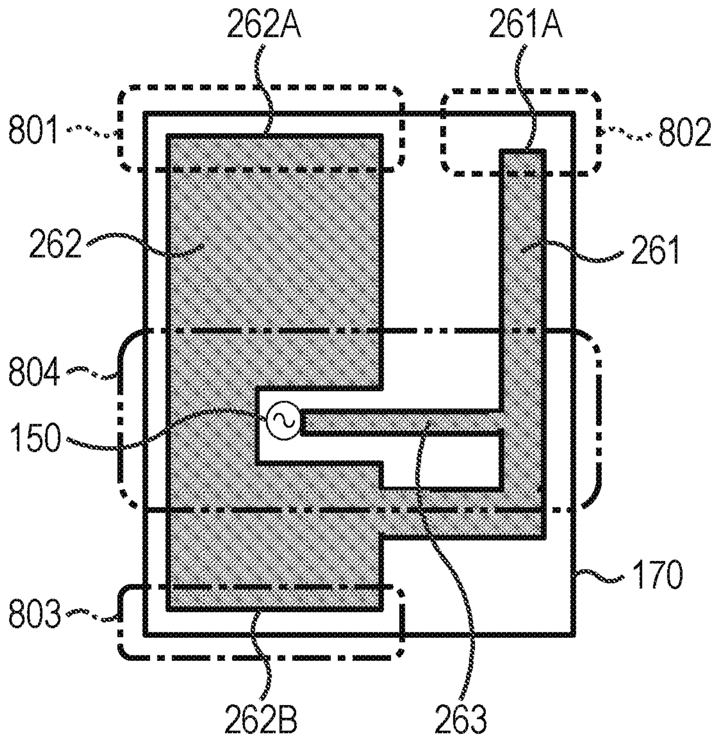
FIG. 8 is a diagram illustrating an example of an intensity distribution of an electromagnetic field in a vicinity of the antenna (inverted-F antenna) illustrated in FIG. 7.

FIG. 8 is a diagram illustrating an example of an intensity distribution of an electromagnetic field in a vicinity of the antenna (inverted-F antenna) 260 illustrated in FIG. 7. In FIG. 8, components similar to those illustrated in FIG. 7 are denoted by the same reference characters, and detailed description thereof will be omitted.

In FIG. 8, regions 801 and 802 illustrated by dotted lines are regions where an intensity of an electric field E is the highest, and a region 803 illustrated by a chain line is a region where the intensity of the electric field E is the second highest. A region 804 illustrated by a chain double-dashed line is a region where an intensity of a magnetic field H is high.

Figure 9:
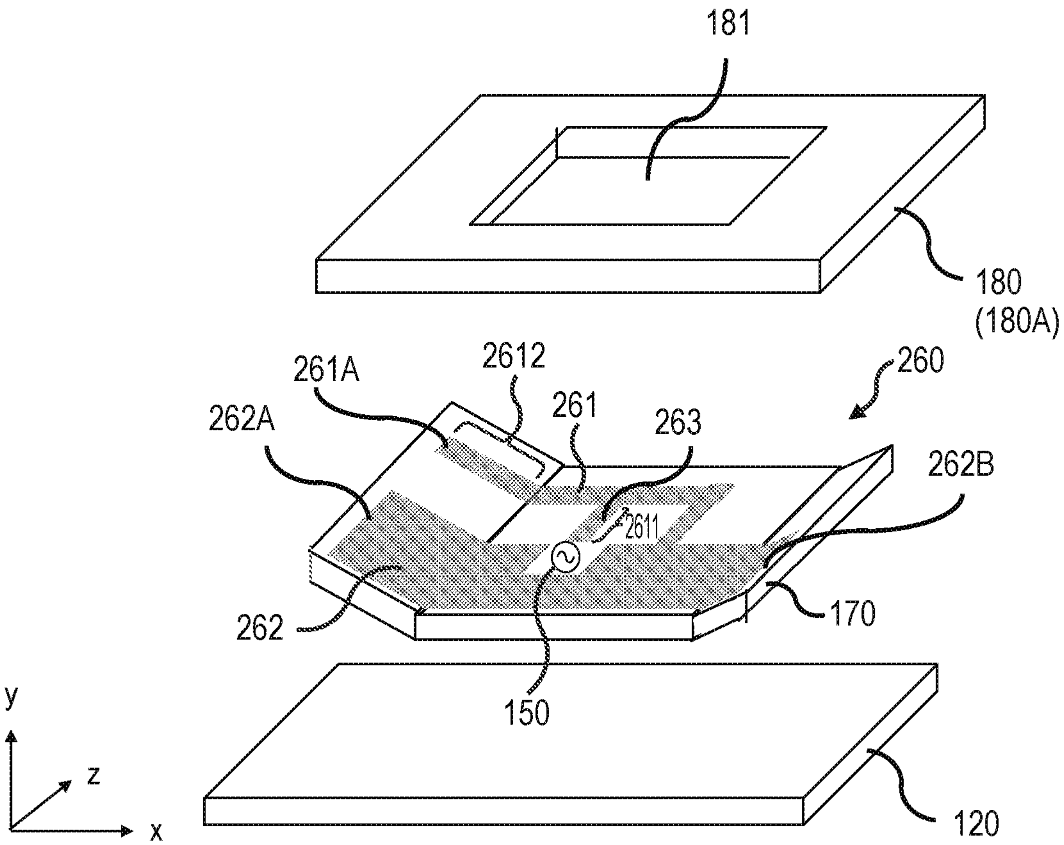
FIG. 9 is a diagram illustrating an example of a schematic configuration of a wireless communication apparatus according to a second embodiment of the present invention.

FIG. 9 is a diagram illustrating an example of a schematic configuration of the wireless communication apparatus 200 according to the second embodiment of the present invention. Components similar to those illustrated in FIG. 1 to FIG. 8 are denoted by the same reference characters, and detailed description thereof will be omitted. FIG. 9 illustrates only part of a configuration of constituting units of the wireless communication apparatus 200 according to the second embodiment. An xyz coordinate system illustrated corresponds to the xyz coordinate system illustrated in FIG. 1.

As described above with reference to FIG. 4A and FIG. 4B, since a magnitude of an SAR value relating to an energy of electromagnetic waves absorbed by a human body has a correlation with the intensity of the magnetic field H, a neighbor region of the power supply line 263, which is included in the region 804 where the intensity of the magnetic field H is high, is disposed close to the fixing member 120 in the present embodiment as illustrated in FIG. 9. That is, the coaxial cable 150 being an electric supply unit and a first region 2611 of the antenna element 261 are disposed at positions closer to the fixing member 120 than a second region 2612 including the open end portion 261A of the antenna element 261. Further, since the decrease in radiant quantity of radio waves at a communication frequency is caused by coupling between the antenna 260 and the fixing member 120 formed of an electric conductor, a neighbor regions of the open end portion 261A of the antenna element as well as neighbor regions of the side edge portions 262A and 262B of the ground conductor portion 262, which are included in the regions 801 to 803 where the intensity of the electric field E is high, are disposed close to the opening 181 in the present embodiment as illustrated in FIG. 9. That is, the second region 2612 of the antenna element 261 is disposed at a position closer to the opening 181 of the outer housing 180 than the coaxial cable 150 and the first region 2611 of the antenna element 261. This structure enables, for the antenna (inverted-F antenna) 260, decreasing an SAR value relating to an energy of electromagnetic waves absorbed by a human body as well as preventing a reduction in radiant quantity of radio waves at a communication frequency. Note that the side edge portion 262B of the ground conductor portion 262 need not be brought close to the opening 181 since the side edge portion 262B forms a region where the intensity of the electric field E is the second highest.

Figure 10:
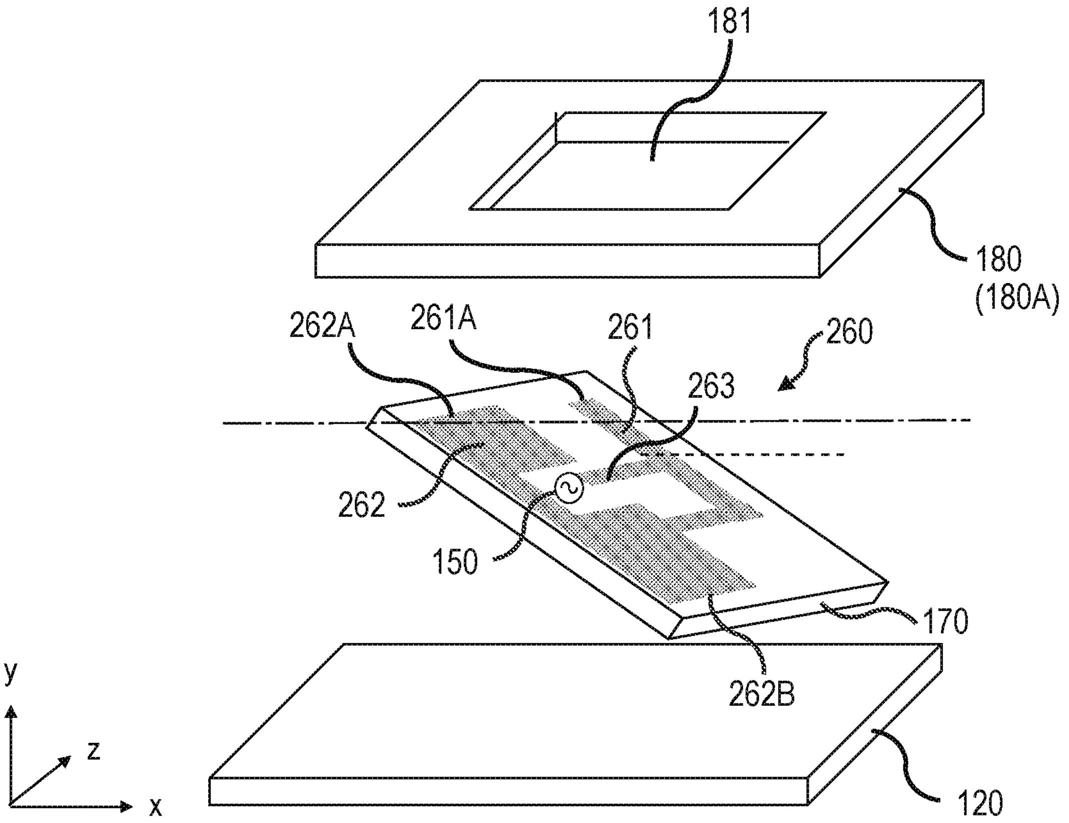
FIG. 10 is a diagram illustrating another example of the schematic configuration of the wireless communication apparatus according to the second embodiment of the present invention.

FIG. 10 is a diagram illustrating another example of the schematic configuration of the wireless communication apparatus 200 according to the second embodiment of the present invention. In FIG. 10, components similar to those illustrated in FIG. 1 to FIG. 9 are denoted by the same reference characters, and detailed description thereof will be omitted. FIG. 10 illustrates only part of the configuration of the constituting units of the wireless communication apparatus 200 according to the second embodiment. FIG. 10 illustrates an xyz coordinate system corresponding to the xyz coordinate systems illustrated in FIG. 1 and FIG. 9.

As illustrated in FIG. 7, in a case where the antenna (inverted-F antenna) 260 is supported by the antenna supporting member 170 formed of a printed wiring board, the antenna 260 cannot be bent as illustrated in FIG. 9. In the case, as illustrated in FIG. 10, the antenna supporting member 170 is disposed being inclined such that the power supply line 263 becomes closer to the fixing member 120 formed of an electric conductor than the end portion 261A of the antenna element 261 and the side edge portion 262A of the ground conductor portion 262, which is close to the open end portion 261A. That is, such configuration may be such that, as illustrated in FIG. 10, a dotted line that is parallel to an xz plane and passes through part of the power supply line 263 is closer to the fixing member 120 formed of an electric conductor than a chain line that passes through part of the open end portion 261A of the antenna element

261 or part of the side edge portion 262A of the ground conductor portion 262, which is close to the open end portion 261A.

Figure 11A:
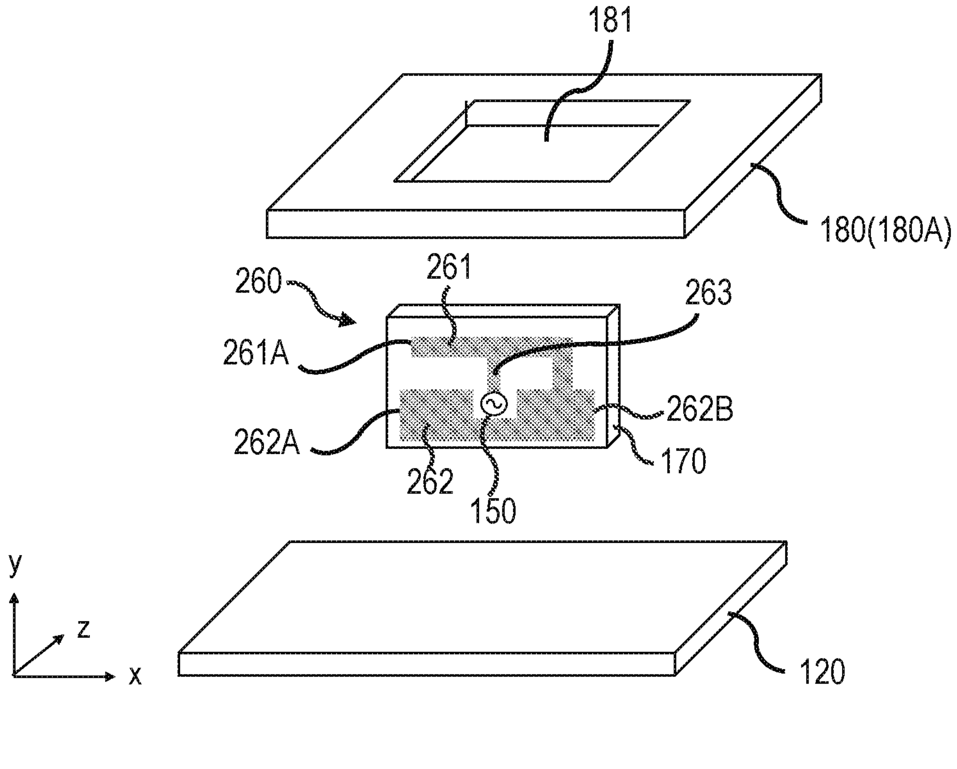
FIG. 11A is a diagram illustrating still another example of the schematic configuration of the wireless communication apparatus according to the second embodiment of the present invention.
Figure 11B:
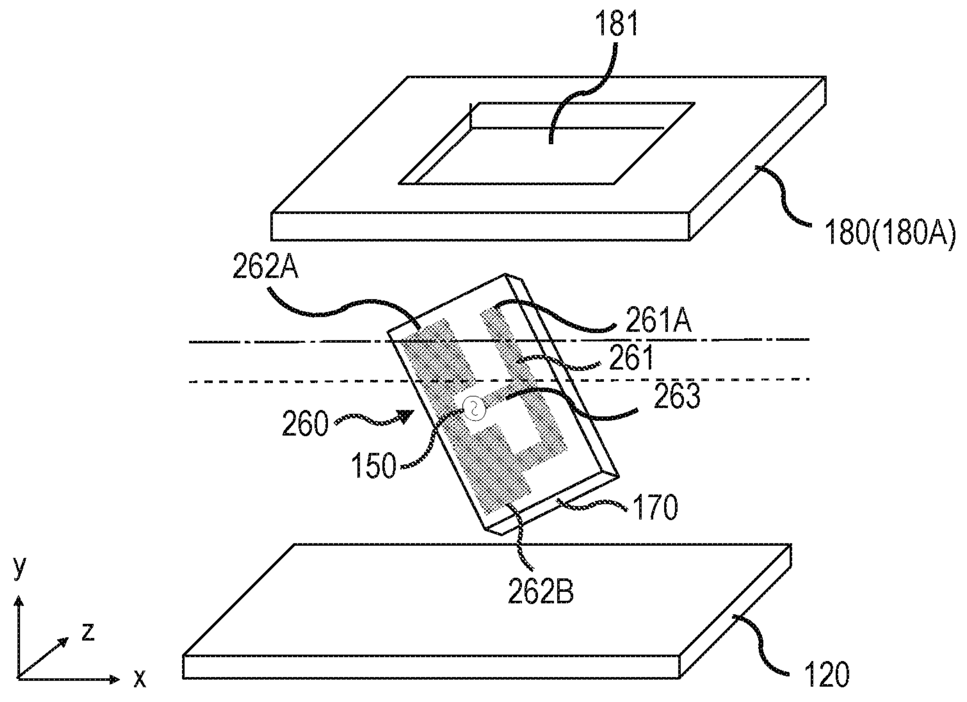
FIG. 11B is a diagram illustrating still another example of the schematic configuration of the wireless communication apparatus according to the second embodiment of the present invention.

FIG. 11A and FIG. 11B are diagrams each illustrating still another example of the schematic configuration of the wireless communication apparatus 200 according to the second embodiment of the present invention. In FIG. 11A and FIG. 11B, components similar to those illustrated in FIG. 1 to FIG. 10 are denoted by the same reference characters, and detailed description thereof will be omitted. FIG. 11A and FIG. 11B each illustrate only part of the configuration of the constituting units of the wireless communication apparatus 200 according to the second embodiment. FIG. 11A and FIG. 11B each illustrate an xyz coordinate system corresponding to the xyz coordinate systems illustrated in FIG. 1, FIG. 9, and FIG. 10.

FIG. 9 described above illustrates a case where the fixing member 120, the antenna 260, and the opening 181 are disposed in this order in they direction and where the antenna 260 is disposed such that the xz plane illustrated in FIG. 7 and the xz plane illustrated in FIG. 9 face the same plane; however, the present embodiment is not limited to this case. For example, as illustrated in FIG. 11A, a configuration in which the xz plane illustrated in FIG. 7 and an xy plane illustrated in FIG. 11A face the same plane, that is, a configuration in which the antenna element 261 is disposed in an orientation perpendicular to a front face of the fixing member 120 is conceivable. As illustrated in FIG. 11B, a configuration in which the antenna element 261 is disposed being inclined with respect to the front face of the fixing member 120 is applicable to the present embodiment.

In the examples illustrated in FIG. 10 to FIG. 11B, the antenna supporting member 170 supports the antenna element 261 and the ground conductor portion 262 in a planar pattern. Further, in the example illustrated in FIG. 9, the antenna supporting member 170 supports the antenna element 261 and the ground conductor portion 262 in a folded pattern. The example illustrated in FIG. 9 is described about a configuration in which the antenna supporting member 170 supports the antenna element 261 and the ground conductor portion 262 in a folded pattern; however, there may be a configuration in which the antenna supporting member 170 supports the antenna element 261 and the ground conductor portion 262 in a curved pattern. That is, in the present embodiment, it is only necessary that the antenna supporting member 170 support the antenna element 261 and the ground conductor portion 262 in at least one of a folded pattern and a curved pattern. Further, the number of folds may be one, or two or more.

For the wireless communication apparatus 200 according to the second embodiment, a configuration similar to the configuration of the wireless communication apparatus 100 in the first embodiment is adopted. That is, the coaxial cable 150 being an electric supply unit and a first region 2611 of the antenna element 261 are disposed at positions closer to the fixing member 120 formed of an electric conductor than a second region 2612 including the open end portion 261A of the antenna element 261. Further, the second region 2612 of the antenna element 261 is disposed at a position closer to the opening 181 for allowing electromagnetic waves from the antenna 260 to radiate outward from the outer housing 180 than the coaxial cable 150 being an electric supply unit and the first region 2611 of the antenna element 261. This configuration enables, as in the first embodiment described above, decreasing an SAR value relating to an energy of electromagnetic waves absorbed by a human body as well as preventing a reduction in a radiant quantity of radio waves at a communication frequency.

Third Embodiment

In the following description given of a third embodiment, description of matters shared with the first and second embodiments will be omitted, and matters different from the first and second embodiments will be described.

While the first embodiment is described about an example in which the antenna 160 is configured as a dipole antenna, the third embodiment will be described about a configuration to which an inverted-F antenna is applied, as in the second embodiment.

A schematic configuration of a wireless communication apparatus according to the third embodiment is basically similar to the schematic configuration of the wireless communication apparatus 100 according to the first embodiment illustrated in FIG. 1 except for a configuration of an antenna 160 and an antenna supporting member 170. In the present embodiment, a wireless communication apparatus 300 is described as the wireless communication apparatus according to the third embodiment.

Figure 12:
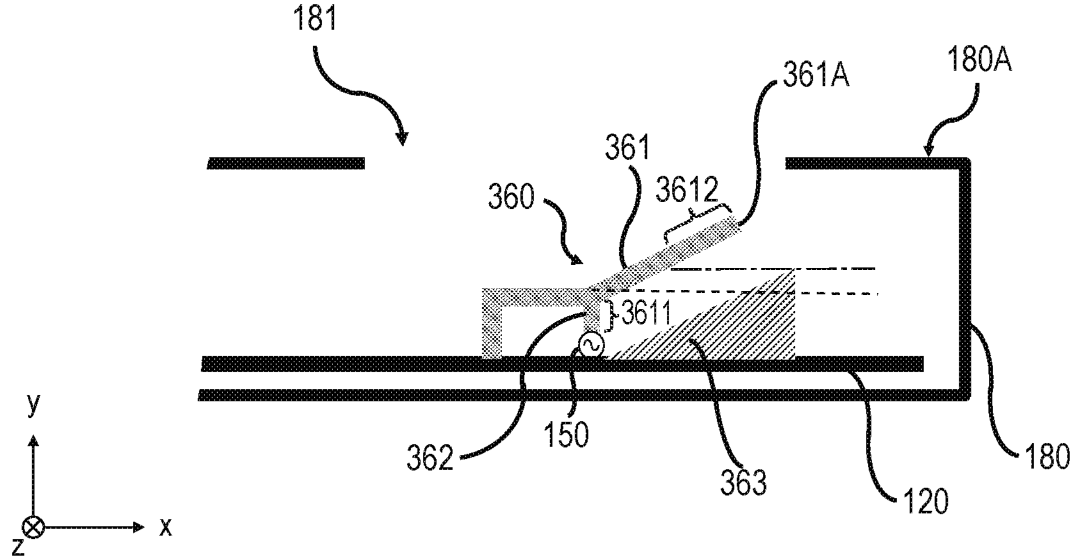
FIG. 12 is a diagram illustrating an example of a schematic configuration of a wireless communication apparatus according to a third embodiment of the present invention.

FIG. 12 is a diagram illustrating an example of a schematic configuration of the wireless communication apparatus 300 according to the third embodiment of the present invention. In FIG. 12, components similar to those illustrated in FIG. 1 to FIG. 11B are denoted by the same reference characters, and detailed description thereof will be omitted. FIG. 12 illustrates only part of the configuration of the constituting units of the wireless communication apparatus 300 according to the third embodiment. FIG. 12 illustrates an xyz coordinate system corresponding to the xyz coordinate systems illustrated in FIG. 1 and FIG. 3.

An antenna 360 is an inverted-F antenna that is grounded to a fixing member 120 formed of an electric conductor. The antenna (inverted-F antenna) 360 includes an antenna element 361, a power supply line (electric conductor portion) 362 formed of an electric conductor, and a projection 363 that has a projecting shape and is formed of an electric conductor. The projection 363 is provided between the antenna element 361 and the fixing member 120. Note that such a projection 363 may be applied to a dipole antenna, a monopole antenna, and an inverted-L antenna.

The antenna element 361 includes one end portion that forms an open end portion 361A and the other end portion that is electrically connected to the fixing member 120 that is formed of an electric conductor and serves as the ground, and the power supply line 362 is provided between the one end portion and the other end portion of the antenna element 361. In this case, the projection 363 formed of an electric conductor is provided on the fixing member 120 formed of an electric conductor, and a dotted line passing through part of the power supply line 362 is disposed closer to the fixing member 120 formed of an electric conductor than a chain line passing through part of the projection 363 serving as the ground.

That is, in the third embodiment, the coaxial cable 150 being an electric supply unit and a first region 3611 of the antenna element 361 are disposed at positions closer to the fixing member 120 than a second region 3612 including the open end portion 361A of the antenna element 361. Further, the second region 3612 of the antenna element 361 is disposed at a position closer to the opening 181 of the outer housing 180 than the coaxial cable 150 and the first region 3611 of the antenna element 361. This configuration enables, as in the first and second embodiments described above, decreasing an SAR value relating to an energy of electromagnetic waves absorbed by a human body as well as preventing a reduction in a radiant quantity of radio waves at a communication frequency.

Fourth Embodiment

In the following description given of a fourth embodiment, description of matters shared with the first to third embodiments will be omitted, and matters different from the first to third embodiments will be described.

FIG. 13A to FIG. 13D are diagrams each illustrating an example of a schematic configuration of a wireless communication apparatus 400 according to the fourth embodiment of the present invention. FIG. 13A to FIG. 13D each illustrate only part of a configuration of constituting units of the wireless communication apparatus 400 according to the fourth embodiment. An xyz coordinate system illustrated here corresponds to the xyz coordinate system illustrated in FIG. 1.

Figure 13A:
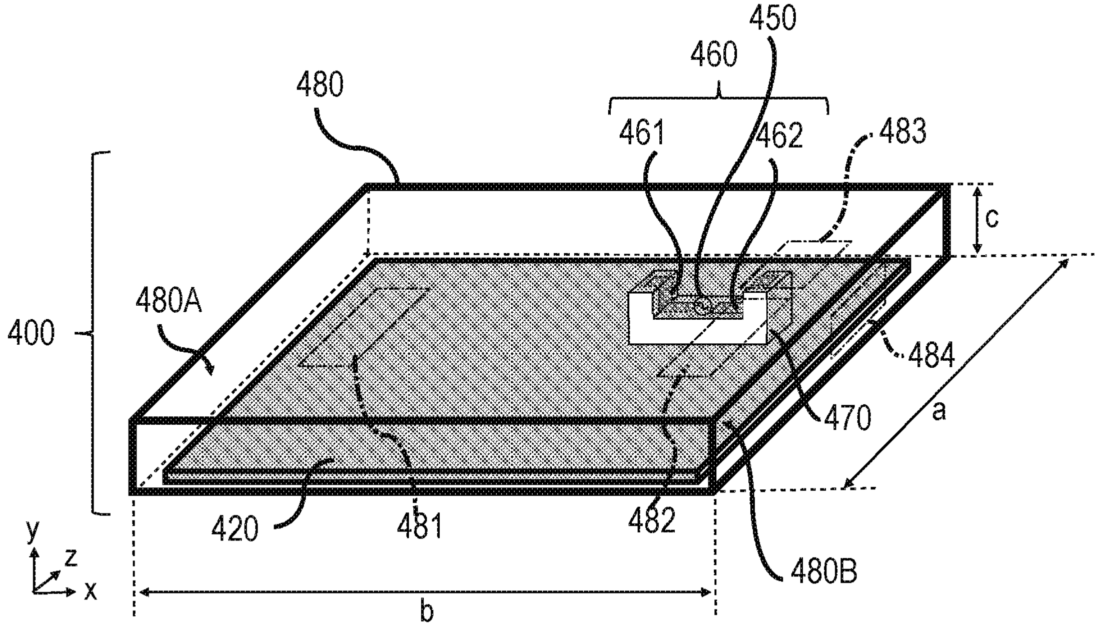
FIG. 13A is a diagram illustrating an example of a schematic configuration of a wireless communication apparatus according to a fourth embodiment of the present invention.

As illustrated in FIG. 13A, the wireless communication apparatus 400 includes a fixing member 420 that is equivalent to the fixing member 120 illustrated in FIG. 1, a coaxial cable 450 that is equivalent to the coaxial cable 150 illustrated in FIG. 1, an antenna 460 that is equivalent to the antenna 160 illustrated in FIG. 1, an antenna supporting member 470 that is equivalent to the antenna supporting member 170 illustrated in FIG. 1, and an outer housing 480 that is equivalent to the outer housing 180 illustrated in FIG. 1. The wireless communication apparatus 400 according to the fourth embodiment is supposed to further include constituting units equivalent to the sensor 110, the battery 130, and the printed circuit board 140 illustrated in FIG. 1. The outer housing 480 includes a face 480A that is provided with openings 481, 482, and 483 and includes a face 480B that is provided with an opening 484.

Figure 13B:
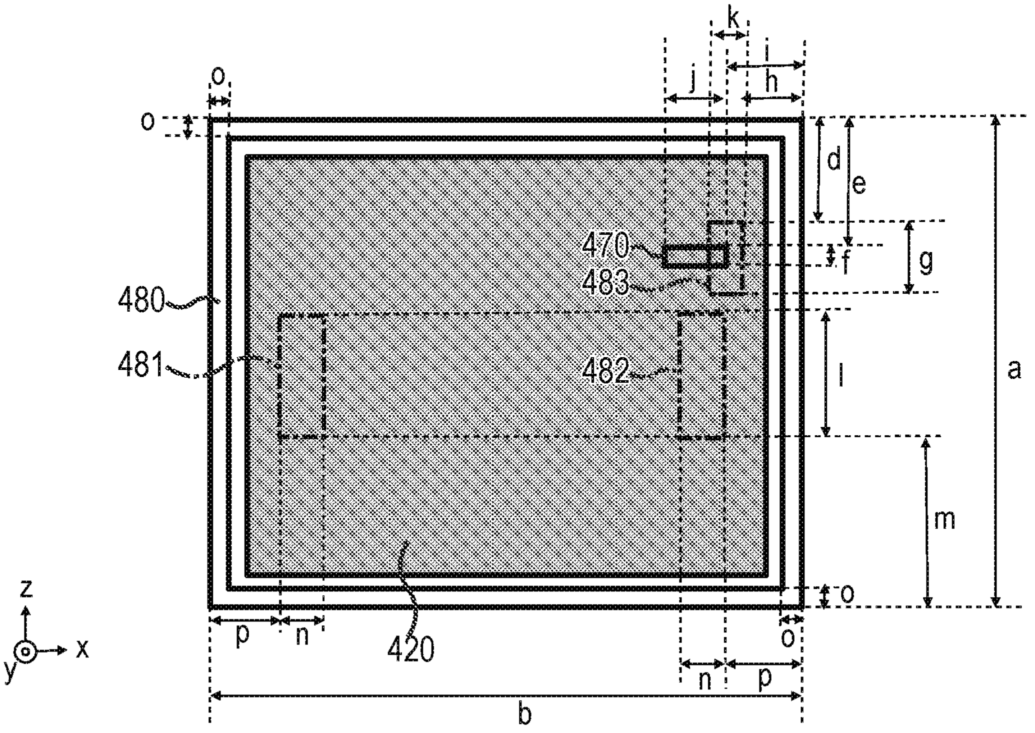
FIG. 13B is a diagram illustrating the example of the schematic configuration of the wireless communication apparatus according to the fourth embodiment of the present invention.
Figure 13C:
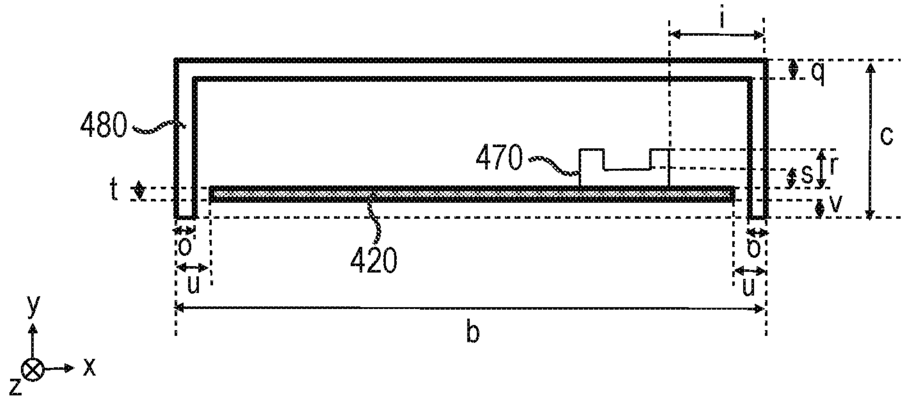
FIG. 13C is a diagram illustrating the example of the schematic configuration of the wireless communication apparatus according to the fourth embodiment of the present invention.
Figure 13D:
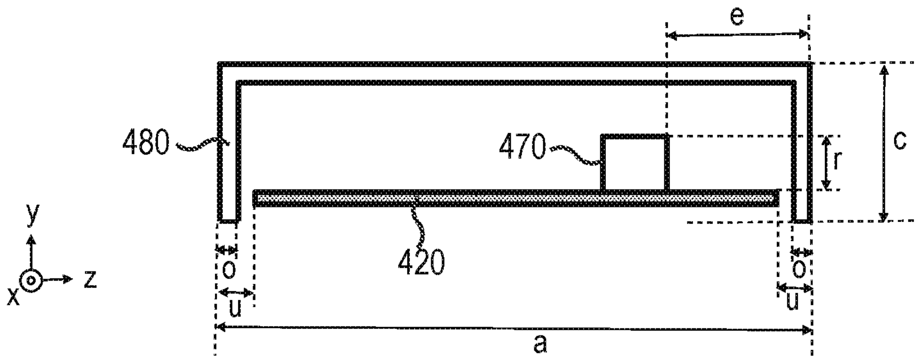
FIG. 13D is a diagram illustrating the example of the schematic configuration of the wireless communication apparatus according to the fourth embodiment of the present invention.

FIG. 13B illustrates an xz cross-sectional view in FIG. 13A, FIG. 13C illustrates an xy cross-sectional view in FIG. 13A, and FIG. 13D illustrates an yz cross-sectional view in FIG. 13A. As illustrated in FIG. 13A, when viewed from a direction perpendicular to an opening face of the opening 483 (y direction), the antenna 460 at least partly overlaps the opening 483, as illustrated in FIG. 13B.

Here, as an example of the fourth embodiment, a numerical experiment was conducted with MW-STUDIO, which is an electromagnetic field simulator from AET, INC., to demonstrate an advantageous effect of applying a digital radiography (DR) as the wireless communication apparatus 400.

In this case, the antenna 460 illustrated in FIG. 13A is a dipole antenna and includes a first antenna element 461 and a second antenna element 462. The antenna 460 is fixed by bonding to the antenna supporting member 470 having a step shape. The antenna supporting member 470 is fixed by bonding to the fixing member 420 formed of an electric conductor. The outer housing 480, which is formed of an electric conductor, is fixed to the fixing member 420 formed of an electric conductor, and the face 480A of the outer housing 480 formed of an electric conductor is provided with the openings 481, 482, and 483 illustrated by chain lines. The face 480B of the outer housing 480 formed of an electric conductor is provided with the opening 484 illustrated by a chain line. The openings are each closed with a resin member. Note that the openings 483 and 484 provided in a vicinity of the antenna 460 are provided for allowing electromagnetic waves emitted by the antenna 460 to radiate outward from the outer housing 480, and the opening 483 is an opening provided at a position that is the closest to the antenna 460. Note that the sensor 110 that detects radioactive rays is not illustrated because the sensor 110 is disposed on a rear face side of the antenna 460 with respect to the fixing member 120 formed of an electric conductor, thus having a low influence.

Table 1 below shows dimensions illustrated in FIG. 13B, FIG. 13C, FIG. 13D, and FIG. 16.

TABLE 1

Dimensions of calculation model

| | | | | | | | | |
|---|---|---|---|---|---|---|---|---|
| | a | b | c | d | e | f | g | h |
| Dimension [mm] | 460 | 460 | 15.5 | 115.2 | 135.1 | 14 | 39.7 | 18.7 |
| | i | j | k | l | m | n | o | p |
| Dimension [mm] | 23.6 | 37 | 19.6 | 111 | 174.5 | 26 | 11 | 35.6 |
| | q | r | s | t | u | v | w1 | w2 |
| Dimension [mm] | 3 | 4.8 | 2.8 | 2 | 16 | 4.5 | 20.5 | 8.3 |

Figure 14:
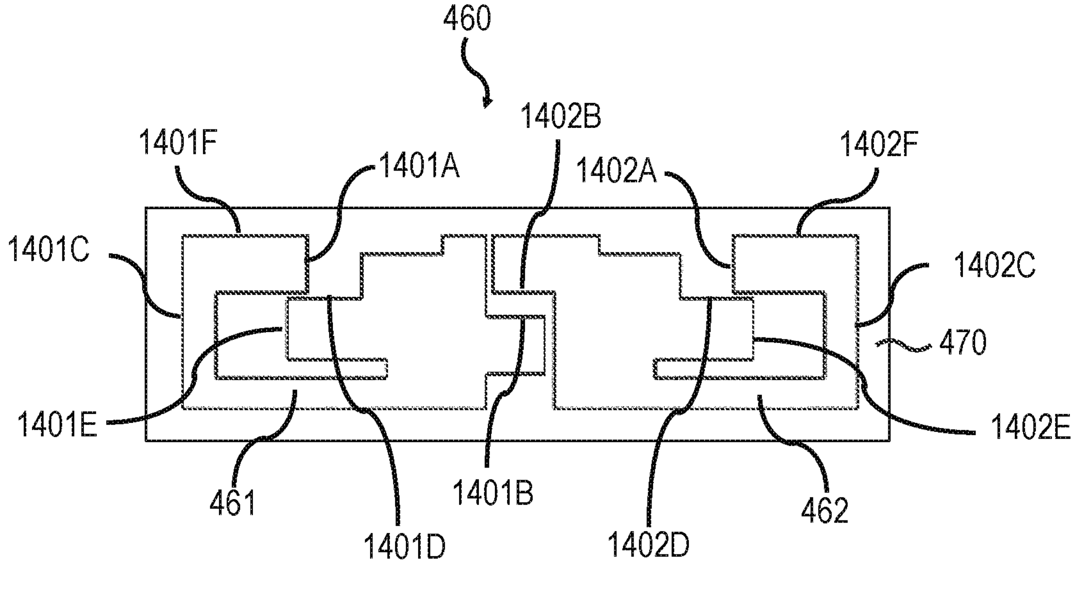
FIG. 14 is a diagram illustrating an example of a conductor pattern of the antenna illustrated in FIG. 13A.

FIG. 14 is a diagram illustrating an example of a conductor pattern of the antenna 460 illustrated in FIG. 13A. Here, as the antenna 460, a 2.4/5 GHz dual-band flexible antenna from Molex, LLC (146153 series) was employed. In this antenna 460, its first antenna element 461 and second antenna element 462 are folded for size reduction; therefore, open end portions 1401A and 1402A of the antenna elements 461 and 462 face toward a center of the antenna 460. Further, the antenna 460 has a shape for radiating radio waves efficiently in a 2 GHz band and 5 GHz band so as to support a frequency band of Wifi communication. The coaxial cable 450 being an electric supply unit is connected between a side edge portion 1401B of the first antenna element 461 and a side edge portion 1402B of the second antenna element 462.

To grasp regions in this antenna 460 illustrated in FIG. 14 where an intensity of an electric field E or an intensity of a magnetic field H is high, dimensions of the conductor pattern of the antenna 460 were measured, and calculation was conducted with MW-STUDIO, an electromagnetic field simulator from AET, INC.

Figure 15A:
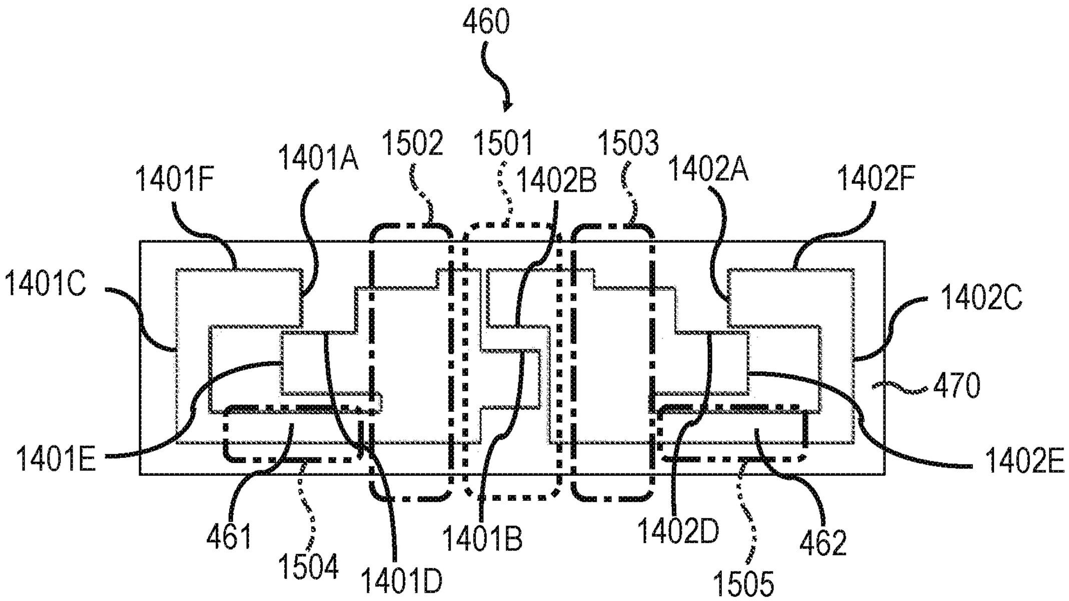
FIG. 15A is a diagram illustrating an intensity distribution of a magnetic field H and an electric field E calculated for the antenna illustrated in FIG. 14.
Figure 15B:
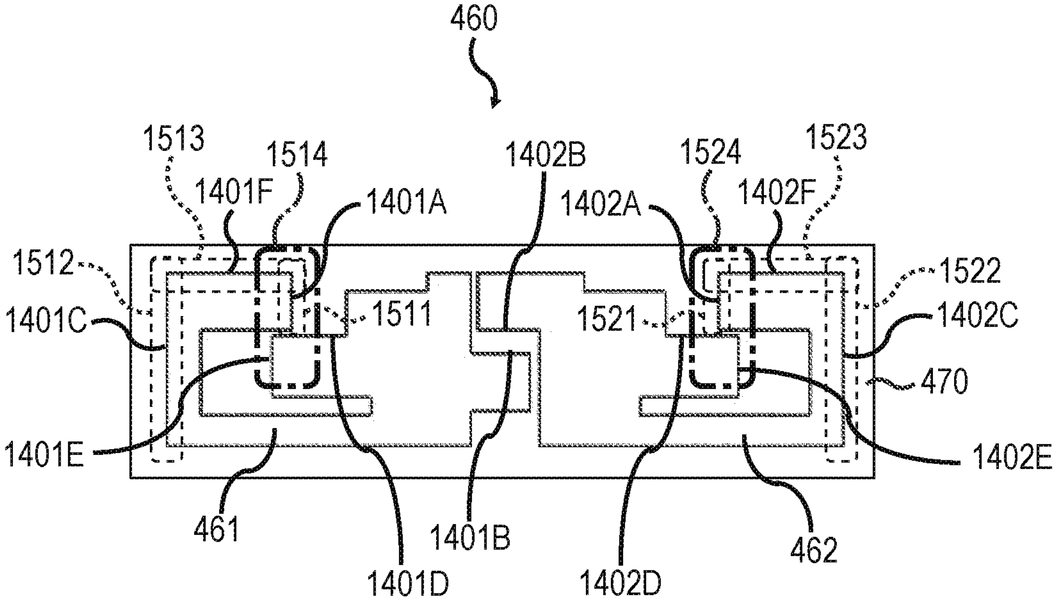
FIG. 15B is a diagram illustrating an intensity distribution of a magnetic field H and an electric field E calculated for the antenna illustrated in FIG. 14.

FIG. 15A and FIG. 15B are diagrams illustrating intensity distributions of a magnetic field H and an electric field E calculated for the antenna 460 illustrated in FIG. 14, respectively. In FIG. 15A and FIG. 15B, components similar to those illustrated in FIG. 14 are denoted by the same reference characters, and detailed description thereof will be omitted.

FIG. 15A illustrates regions where an intensity of the magnetic field H of the antenna 460 is high, and FIG. 15B illustrates regions where an intensity of the electric field E is high. Note that observation frequencies were 2.4 GHz and 5.3 GHz. The regions illustrated in FIG. 15A where an intensity of the magnetic field is high are substantially the same between 2.4 GHz and 5.3 GHz; a region 1501, where the intensity of the magnetic field is the highest, is a region including an electric supply point at which the coaxial cable 450 is connected, namely the side edge portions 1401B and 1402B, as illustrated by a dotted line in FIG. 15A. Further, regions 1502 and 1503, where the intensity of the magnetic field is the second highest, are regions adjacent to the electric supply point, as illustrated by chain lines in FIG. 15A, and regions 1504 and 1505, where the intensity of the magnetic field is the third highest, are regions between the electric supply point and the open end portions 1401A and 1402A in the antenna elements 461 and 462, as illustrated by chain double-dashed lines in FIG. 15A. Note that the intensity of the magnetic field H is not uniform in each of the regions; the intensity becomes lower at a position closer to the open end portions 1401A and 1402A of the antenna.

Regions 1511 to 1513 and 1521 to 1523 illustrated in FIG. 15B, where the intensity of the electric field E is high at a frequency of 2.4 GHz, are regions of the open end portions 1401A and 1402A of the antenna elements 461 and 462, regions of side edge portions 1401C and 1402C in a longitudinal direction of an outline of the antenna 460, and regions of the side edge portions 1401F and 1402F between the open end portions 1401A and 1402A and the side edge portions 1401C and 1402C, respectively, as illustrated by dotted lines in FIG. 15B. Regions 1514 and 1524, where the intensity of the electric field E is high at a frequency of 5.3 GHz, include regions of the open end portions 1401A and 1402A of the antenna elements 461 and 462 and regions of side edge portions 1401D and 1401E of the antenna element 461 and side edge portions 1402D and 1402E of the antenna element 462, respectively, as illustrate by chain lines in FIG. 15B. Note that the intensity of the electric field E is not uniform in each of the regions; the intensity becomes higher at a position closer to the open end portions 1401A and 1402A of the antenna elements 461 and 462.

In the present embodiment, a member that is formed of a dielectric and has a stepped shape is employed as the antenna supporting member 470 so that the regions described above where the intensity of the magnetic field H is high is disposed close to the fixing member 420 formed of an electric conductor and that the regions described above where the intensity of the electric field E is high is disposed close to the opening 483.

Figure 16:
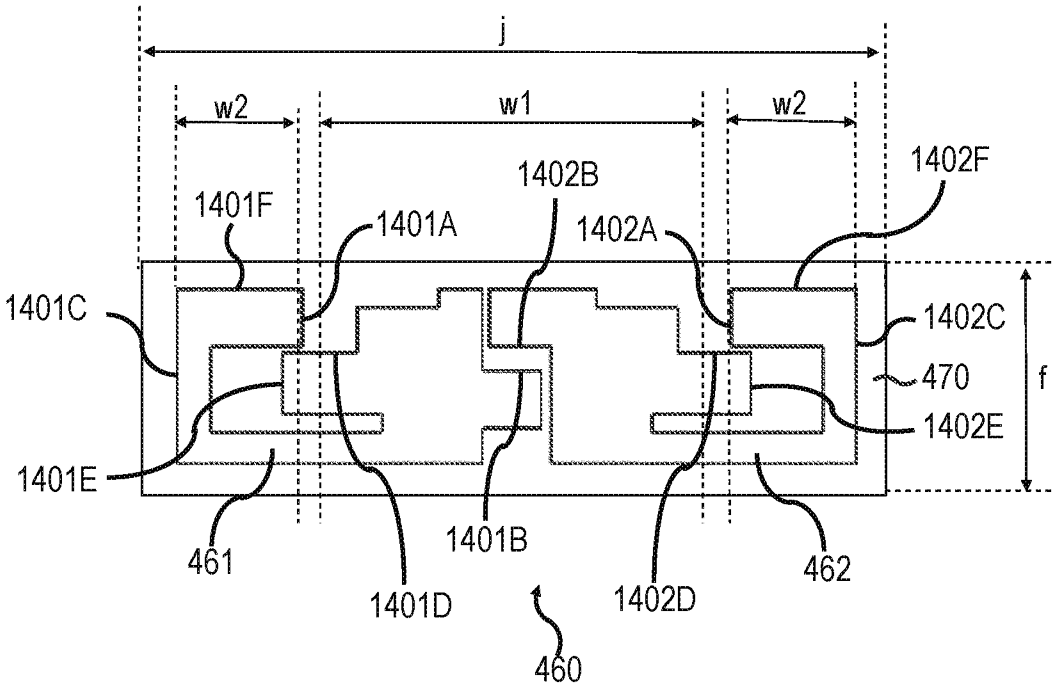
FIG. 16 is a diagram illustrating an example of dimensions of the conductor pattern of the antenna illustrated in FIG. 14.

FIG. 16 is a diagram illustrating an example of dimensions of the conductor pattern of the antenna 460 illustrated in FIG. 14. In FIG. 16, components similar to those illustrated in FIG. 14 to FIG. 15B are denoted by the same reference characters, and detailed description thereof will be omitted.

In a region having an area of w1×f illustrated in FIG. 16, the antenna supporting member 470 was formed such that the shortest distance from the fixing member 420 to the antenna 460 was set to 2.8 mm. In a region having an area of w2×f, the antenna supporting member 470 was formed to have a shape such that the shortest distance from the fixing member 420 to the antenna 460 was set to a dimension of 4.8 mm. To demonstrate an advantage of the present embodiment, calculation was performed on antennas with antenna supporting members 470 that had no step and in which the shortest distances from the fixing member 420 formed of an electric conductor to their antenna elements 461 were made constant: 2.8 mm, 3.8 mm, and 4.8 mm, and results of the calculation were compared with results of calculation performed on the antenna according to the present embodiment.

To calculate SAR values, an anthropomorphic phantom having dimensions of 594×520×46 [mm], which were larger than those of an outline of the DR, was placed being in intimate contact with the faces 480A and 480B. For the calculation of SAR values, material properties of a solvent of the anthropomorphic phantom used in measurement conforming to an international standard were used, and the material properties include an electric conductivity σ of 2 [S/m], a relative permittivity of 52.21, a Tan δ of 0.28, and a material density ρ of 1000. The electric conductors of the fixing member 420 and the like were each a stainless having an electric conductivity σ of 1100000 [S/m]. An electric field E in the anthropomorphic phantom was observed, and the SAR values were calculated from SAR [W/Kg]=E×E×ρ/σ. For communication characteristics, radiation efficiencies of the antennas were calculated with the anthropomorphic phantom removed. The radiation efficiencies were each calculated as a ratio between an electric power supplied to a signal line at a communication frequency and a total electric power of radiated electromagnetic waves passing through locations around the antenna 460 that are 1 [m] away from the antenna 460. Table 2 shows results of the calculations of the SAR values and the radiation efficiencies.

[Table 2]

TABLE 2

Results of measuring SAR value and radiation efficiency of shapes of supporting member

| | | 2.8 mm constant | 3.8 mm constant | 4.8 mm constant | Stepped shape |
|---|---|---|---|---|---|
| 5.5 GHz | SAR[W/Kg] | 1.31 | 1.41 | 1.46 | 0.99 |
| | Radiation efficiency [dB] | −3.9 | −2.0 | −1.35 | −3.89 |
| 2.4 GHz | SAR[W/Kg] | 1.7 | 1.76 | 1.79 | 0.81 |
| | Radiation efficiency [dB] | −10.95 | −7.49 | −4.18 | −6.32 |

Comparing results from the 2.8 mm constant distance, the 3.8 mm constant distance, and the 4.8 mm constant distance, the SAR value decreases with a decrease in distance from the fixing member 420 to the antenna 460, and the 2.8 mm constant distance gives the lowest SAR value. In contrast, the values of the radiation efficiency increase with a decrease in distance from the opening to the antenna 460, and the 4.8 mm constant distance gives the best radiation efficiency. Of the three levels described above, the balance between a radiant quantity of radio waves and an SAR value can be established by employing the 3.8 mm constant distance. Comparing results from the stepped shape in the present embodiment and the results from the 3.8 mm constant distance, the stepped shape improved more in radiation efficiency than the 3.8 mm constant distance at 2.4 GHz but slightly less improved at 5.5 GHz. In contrast, the stepped shape gives decreased SAR values at 2.4 GHz and 5.5 GHz. That is, the structure in the present embodiment enables decreasing an SAR value relating to an energy of electromagnetic waves absorbed by a human body as well as preventing a reduction in radiant quantity of radio waves at a communication frequency.

In addition, a percentage of a region in the stepped shape that is to be brought close to the fixing member 420 formed of an electric conductor to a length of the antenna elements 461 and 462 was roughly calculated.

Figure 17:
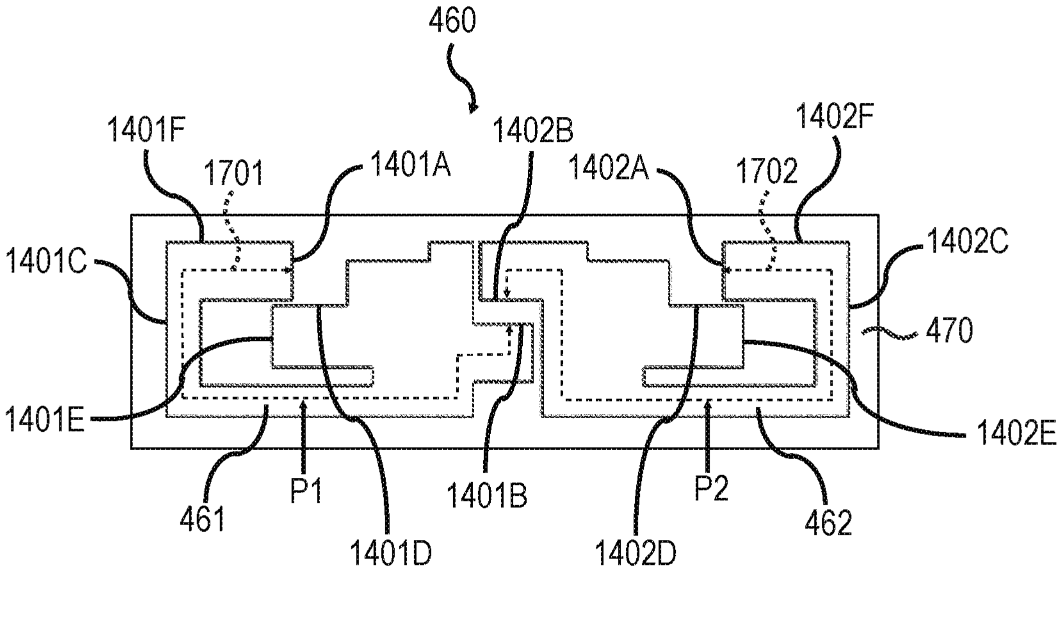
FIG. 17 is a diagram illustrating an example of the conductor pattern of the antenna illustrated in FIG. 14.

FIG. 17 is a diagram illustrating an example of the conductor pattern of the antenna 460 illustrated in FIG. 14. Dotted lines 1701 and 1702 are drawn by connecting middle points of widths of the antenna elements 461 and 462 along the antenna elements, respectively. An antenna element length of the first antenna element 461 is a dimension of 32.6 [mm] from the side edge portion 1401B to the open end portion 1401A. An antenna element length of the second antenna element 462 is a dimension of 36.95 [mm] from the side edge portion 1402B to the open end portion 1402A. Locations P1 and P2 are at end portions of the dimension w1 in Table 1, and a distance from the side edge portion 1401B to the location P1 is 14.015 [mm]. A distance from the side edge portion 1402B to the location P2 is 18.315 [mm]. That is, the first antenna element 461 is disposed such that 43.0% of a total length 1701 of the antenna element from the electric supply unit is brought close to the electric conductor. Further, the second antenna element 462 is disposed such that 49.6% of a total length 1702 of the antenna element from the electric supply unit is brought close to the electric conductor.

From the above, an advantageous effect of the present embodiment is provided by bringing regions from the electric supply unit to locations of about 50% of the total lengths of the antenna elements 461 and 462, namely to midpoints of their antenna element lengths, close to the fixing member 420 formed of an electric conductor.

Figure 18A:
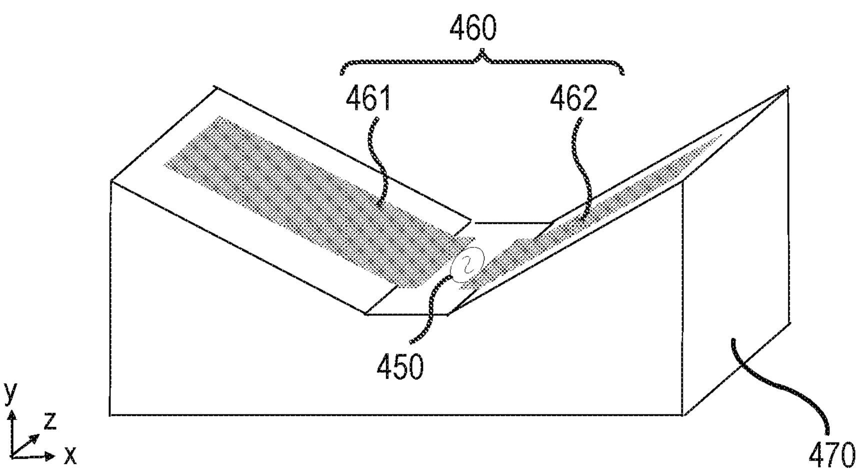
FIG. 18A is a diagram illustrating an example of constituting units equivalent to an antenna and an antenna supporting member illustrated in FIG. 13A.
Figure 18B:
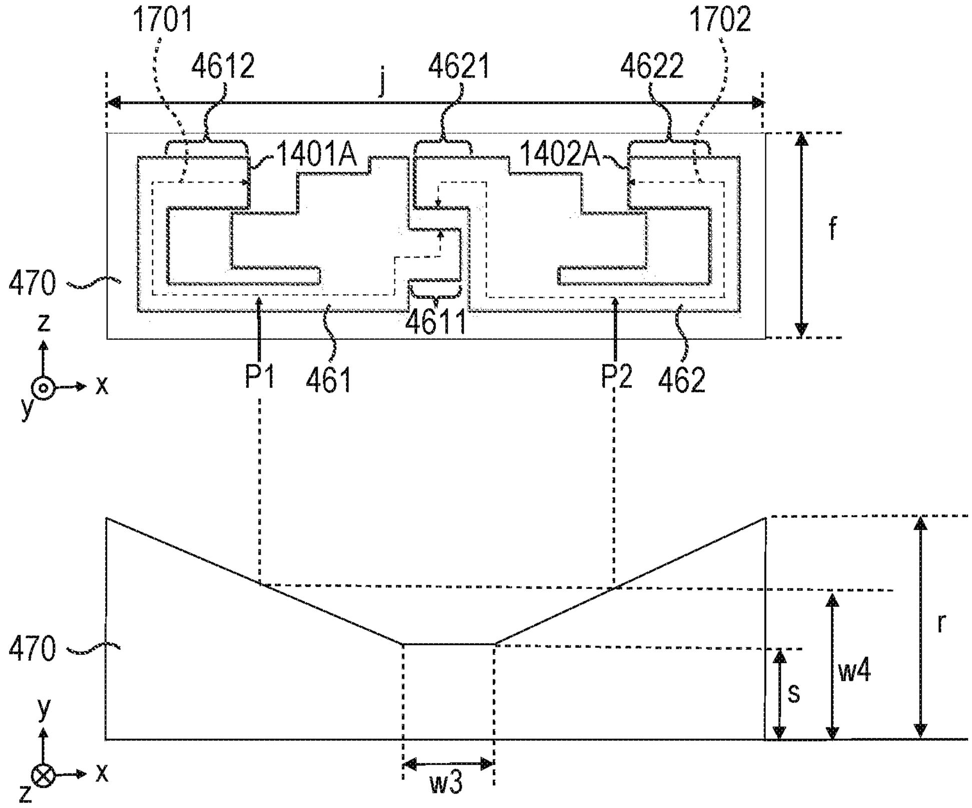
FIG. 18B is a diagram illustrating an example of the constituting units equivalent to the antenna and the antenna supporting member illustrated in FIG. 13A.

FIG. 18A and FIG. 18B are diagrams each illustrating an example of constituting units equivalent to the antenna 460 and the antenna supporting member 470 illustrated in FIG. 13A. In place of the antenna supporting member 470 having a stepped shape illustrated in FIG. 13A, an antenna supporting member 470 having a V shape is applied as illustrated in FIG. 18A, also in this case, the advantageous effect is provided to the same extent. A dimension w3 illustrated in FIG. 18B is 4 mm, and distances from the fixing member 420 are s=2.8 mm and r=4.8 mm. A percentage of a distance by which a region in this shape to be disposed close to the fixing member 420 was calculated. At the location P1 and the location P2, a distance w4 from the fixing member 420 is 3.789 mm. That is, a dimension of 49.5% of a difference value between a longest distance r from the fixing member 420 to the antenna elements 461 and 462 and a shortest distance s from the fixing member 420 to the antenna elements 461 and 462 is disposed close to the shortest distance s. In other words, the antenna elements 461 and 462 are disposed such that the distance w4 from the fixing member 420 at the location P1 and the location P2 is less than a dimension obtained by adding a dimension less than half a difference between the longest distance r and the shortest distance s from the fixing member 420 to the antenna elements 461 and 462 and a dimension of the shortest distance s.

From the above, an advantageous effect of the present embodiment is provided by disposing the antenna elements 461 and 462 such that, for a region to be brought close to the electric conductor, a dimension of less than half of the difference between the longest distance and the shortest distance from the fixing member 420 to the antenna elements 461 and 462 is brought close to the shortest distance.

For the wireless communication apparatus 400 according to the fourth embodiment, a configuration similar to the configuration of the wireless communication apparatus 100 in the first embodiment is adopted. That is, as illustrated in FIG. 18A and FIG. 18B, the coaxial cable 150 being an electric supply unit as well as the first regions 4611 and 4621 of the antenna elements 461 and 462 are disposed at positions closer to the fixing member 120 formed of an electric conductor than second regions 4612 and 4622 of the antenna elements 461 and 462, respectively. This configuration enables, as in the first embodiment, decreasing an SAR value relating to an energy of electromagnetic waves absorbed by a human body as well as preventing a reduction in a radiant quantity of radio waves at a communication frequency.

Other Embodiments

In the embodiments of the present invention described above, a dipole antenna or an inverted-F antenna is applied as the antenna, but the antenna in the present invention is not limited to a dipole antenna and an inverted-F antenna; as the antenna, what is called an inverted-L antenna or a monopole antenna is also applicable. In a case where a monopole antenna is applied, the antenna further includes, in addition to an antenna element, a ground conductor portion (or an electric conductor portion formed of an electric conductor) to be used as a ground of the antenna element and has a configuration in which one end portion of the antenna element forms an open end portion, and an electric supply unit is provided between the other end portion and the ground conductor portion (or the electric conductor portion). In a case where an inverted-L antenna is applied, the antenna further includes, in addition to an antenna element, a ground conductor portion (or an electric conductor portion formed of an electric conductor) to be used as a ground of the antenna element and has a configuration in which one end portion of the antenna element forms an open end portion, the antenna has a crank shape between the one end portion and the other end portion, and an electric supply unit is provided between the other end portion and the ground conductor portion (or the electric conductor portion).

The embodiments are described above about examples in which the present invention is applied to a DR as a wireless communication apparatus; however, the present invention may be applied to a camera or the like having a wireless communication function.

According to the embodiments described above, an SAR value relating to an energy of electromagnetic waves absorbed by a human body can be decreased while a reduction in radiant quantity of radio waves at a communication frequency is prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A wireless communication apparatus comprising:

an antenna including an antenna element having a connection portion and an open end portion, wherein the antenna element has a path length between the connection portion and the open end portion;

a conductor member formed of an electric conductor;

an electric supply unit electrically connected to the connection portion of the antenna element and configured to supply electric power to the antenna; and an outer housing formed of an electric conductor and configured to enclose the antenna, the conductor member, and the electric supply unit, the outer housing having an opening for allowing electromagnetic waves from the antenna to radiate outward from the outer housing, wherein the antenna is disposed at a position closer to the opening of the outer housing than to the conductor member, and the connection portion and a midpoint corresponding to a half length of the path length of the antenna element are located closer to the conductor member than a surface of the open end portion, and the surface of the open end portion is a surface facing the conductor member side.

2. The wireless communication apparatus according to claim 1, wherein at least part of the antenna is configured to overlap the opening when viewed from a direction perpendicular to an opening face of the opening.

3. The wireless communication apparatus according to claim 1, wherein a second region of the antenna element including the open end portion is disposed at a position closer to the opening of the outer housing than a first region of the antenna element including the connection portion.

4. The wireless communication apparatus according to claim 3, wherein the first region of the antenna element is included in a region between the connection portion and the midpoint.

5. The wireless communication apparatus according to claim 4, wherein a longest distance between the conductor member and the antenna element is a first distance, a shortest distance between the conductor member and the antenna element is a second distance, a difference between the first distance and the second distance is a third distance, a sum of a distance of ½ of the third distance and the second distance is a fourth distance, a longest distance between the conductor member and the first region is shorter than the fourth distance.

6. The wireless communication apparatus according to claim 1, wherein the antenna further includes a projection between the antenna element and the conductor member, the projection being formed of an electric conductor and having a projecting shape.

7. The wireless communication apparatus according to claim 1, wherein the antenna is a dipole antenna including a first antenna element and a second antenna element as the antenna element, the first antenna element and the second antenna element each have one end portion that forms the open end portion, and the electric supply unit is provided between another end portion of the first antenna element and another end portion of the second antenna element.

8. The wireless communication apparatus according to claim 7, further comprising a supporting member configured to support the antenna and fixed to the conductor member, wherein the supporting member is configured to support the first antenna element and the second antenna element in a linear pattern from the one end portion to the other end portion of each of the first antenna element and the second antenna element.

9. The wireless communication apparatus according to claim 7, further comprising a supporting member configured to support the antenna and fixed to the conductor member, wherein the supporting member is configured to support the first antenna element and the second antenna element from the one end portion to the other end portion of each of the first antenna element and the second antenna element in at least one of a folded pattern and a curved pattern.

10. The wireless communication apparatus according to claim 1, wherein the antenna is an inverted-F antenna further including a ground conductor portion to be used as a ground of the antenna element, and the antenna element includes one end portion forming the open end portion, another end portion short-circuited to the ground conductor portion, and a portion between the one end portion and the other end portion, the portion configured to serve as a power supply line electrically connected to the electric supply unit.

11. The wireless communication apparatus according to claim 10, further comprising a supporting member configured to support the antenna and fixed to the conductor member, wherein the supporting member is configured to support the antenna element and the ground conductor portion in a planar pattern.

12. The wireless communication apparatus according to claim 10, further comprising a supporting member configured to support the antenna and fixed to the conductor member, wherein the supporting member is configured to support the antenna element and the ground conductor portion in at least one of a folded pattern and a curved pattern.

13. The wireless communication apparatus according to claim 1, wherein the antenna is an inverted-F antenna further including an electric conductor portion formed of an electric conductor, and the antenna element includes one end portion forming the open end portion, another end portion short-circuited to the electric conductor portion, and a portion between the one end portion and the other end portion, the portion configured to serve as a power supply line electrically connected to the electric supply unit.

14. The wireless communication apparatus according to claim 1, wherein the antenna is a monopole antenna further including a ground conductor portion to be used as a ground of the antenna element, and one end portion of the antenna element forms the open end portion, and the electric supply unit is provided between another end portion of the antenna element and the ground conductor portion.

15. The wireless communication apparatus according to claim 1, wherein the antenna is a monopole antenna further including an electric conductor portion formed of an electric conductor, and one end portion of the antenna element forms the open end portion, and the electric supply unit is provided between another end portion of the antenna element and the electric conductor portion.

16. The wireless communication apparatus according to claim 1, wherein the wireless communication apparatus is a digital radiography further including a sensor configured to detect radioactive rays.

* * * * *